United States Patent
Ogushi et al.

(10) Patent No.: US 7,512,688 B2
(45) Date of Patent: Mar. 31, 2009

(54) PPPOE NETWORK SYSTEM THAT CAN DISTRIBUTE CONNECTION REQUESTS FROM PPPOE CLIENT TERMINALS TO SPECIFIC PPPOE SERVERS

(75) Inventors: Minoru Ogushi, Yokohama (JP); Norihisa Matsumoto, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 1038 days.

(21) Appl. No.: 10/219,290

(22) Filed: Aug. 16, 2002

(65) Prior Publication Data
US 2003/0182434 A1    Sep. 25, 2003

(30) Foreign Application Priority Data
Mar. 1, 2002    (JP)    ............................ P2002-055503

(51) Int. Cl.
G06F 15/16    (2006.01)
(52) U.S. Cl. ...................... 709/227; 709/223; 709/226; 718/105
(58) Field of Classification Search ................. 709/223, 709/226; 718/105
See application file for complete search history.

(56) References Cited

U.S. PATENT DOCUMENTS

| | | | | |
|---|---|---|---|---|
| 5,752,003 | A | * | 5/1998 | Hart ............................ 709/223 |
| 5,774,660 | A | * | 6/1998 | Brendel et al. ............... 709/201 |
| 5,774,668 | A | * | 6/1998 | Choquier et al. ............ 709/223 |
| 5,951,694 | A | * | 9/1999 | Choquier et al. .............. 714/15 |
| 5,956,489 | A | * | 9/1999 | San Andres et al. ......... 709/221 |
| 6,006,264 | A | * | 12/1999 | Colby et al. ................. 709/226 |
| 6,038,664 | A | * | 3/2000 | Schumacher et al. ........... 713/2 |
| 6,047,309 | A | * | 4/2000 | Dan et al. .................... 709/201 |
| 6,067,545 | A | * | 5/2000 | Wolff ........................... 707/10 |
| 6,078,960 | A | * | 6/2000 | Ballard ........................ 709/229 |
| 6,094,437 | A | * | 7/2000 | Loehndorf et al. .......... 370/420 |
| 6,112,245 | A | * | 8/2000 | Araujo et al. ................ 709/228 |

(Continued)

FOREIGN PATENT DOCUMENTS

JP    2000-29813    1/2000

(Continued)

OTHER PUBLICATIONS

Mamakos, L., et al. RFC 2516: A Method for Transmitting PPP Over Ethernet. 1999. The Internet Society. pp. 1-17.*

(Continued)

*Primary Examiner*—Jeffrey Pwu
*Assistant Examiner*—Alicia Baturay
(74) *Attorney, Agent, or Firm*—Mattingly, Stanger, Malur & Brundidge, P.C.

(57) ABSTRACT

Disclosed is a network system that can distribute connection requests from PPPoE client terminals to specific PPPoE servers under the initiative of the PPPoE servers. In the system that realizes connection between at least one client terminal and plural servers at least by a connection start signal from the client terminal, a connection provision signal from the servers, corresponding to the connection start signal, and a connection request signal from the client terminal, corresponding to the connection provision signal; the servers have an identification information setting means, upon receiving a connection start signal from the client terminal, for setting server identification information for identifying a specific server to receive a connection request signal corresponding to the connection start signal in the connection provision signal.

18 Claims, 16 Drawing Sheets

U.S. PATENT DOCUMENTS

| | | | | |
|---|---|---|---|---|
| 6,128,279 | A * | 10/2000 | O'Neil et al. | 370/229 |
| 6,128,642 | A * | 10/2000 | Doraswamy et al. | 709/201 |
| 6,148,405 | A * | 11/2000 | Liao et al. | 726/2 |
| 6,175,869 | B1 | 1/2001 | Ahuja et al. | 709/226 |
| 6,182,139 | B1 * | 1/2001 | Brendel | 709/226 |
| 6,266,335 | B1 * | 7/2001 | Bhaskaran | 370/399 |
| 6,327,622 | B1 * | 12/2001 | Jindal et al. | 709/228 |
| 6,366,558 | B1 | 4/2002 | Howes et al. | 370/219 |
| 6,377,975 | B1 | 4/2002 | Florman | 709/203 |
| 6,389,448 | B1 | 5/2002 | Primak et al. | 718/105 |
| 6,434,141 | B1 * | 8/2002 | Oz et al. | 370/352 |
| 6,466,976 | B1 * | 10/2002 | Alles et al. | 709/224 |
| 6,556,541 | B1 * | 4/2003 | Bare | 370/235 |
| 6,598,077 | B2 | 7/2003 | Primak et al. | 709/219 |
| 6,625,152 | B1 | 9/2003 | Monsen et al. | 370/392 |
| 6,654,807 | B2 * | 11/2003 | Farber et al. | 709/225 |
| 6,671,259 | B1 * | 12/2003 | He et al. | 370/238 |
| 6,704,282 | B1 * | 3/2004 | Sun et al. | 370/237 |
| 6,711,162 | B1 * | 3/2004 | Ortega et al. | 370/389 |
| 6,718,361 | B1 * | 4/2004 | Basani et al. | 709/201 |
| 6,728,961 | B1 * | 4/2004 | Velasco | 718/105 |
| 6,742,044 | B1 * | 5/2004 | Aviani et al. | 709/235 |
| 6,748,416 | B2 * | 6/2004 | Carpenter et al. | 709/202 |
| 6,763,018 | B1 | 7/2004 | Puthiyandyil et al. | 370/352 |
| 6,772,333 | B1 * | 8/2004 | Brendel | 713/153 |
| 6,798,751 | B1 * | 9/2004 | Voit et al. | 370/252 |
| 6,891,825 | B1 * | 5/2005 | O'Dell et al. | 370/352 |
| 6,904,054 | B1 * | 6/2005 | Baum et al. | 370/467 |
| 6,912,588 | B1 * | 6/2005 | Jardin et al. | 709/238 |
| 6,917,592 | B1 * | 7/2005 | Ramankutty et al. | 370/237 |
| 6,937,608 | B1 * | 8/2005 | Deng | 370/432 |
| 6,944,678 | B2 * | 9/2005 | Lu et al. | 709/245 |
| 6,950,849 | B1 * | 9/2005 | Brandstatter | 709/203 |
| 6,956,846 | B2 * | 10/2005 | Lewis et al. | 370/352 |
| 6,996,110 | B1 * | 2/2006 | Amara et al. | 370/396 |
| 7,039,916 | B2 * | 5/2006 | Jason, Jr. | 718/105 |
| 7,043,253 | B2 * | 5/2006 | Madour et al. | 455/453 |
| 7,149,224 | B1 * | 12/2006 | Krishnamurthy | 370/401 |
| 7,228,358 | B1 * | 6/2007 | McManus | 709/239 |
| 7,295,953 | B2 * | 11/2007 | Cox et al. | 702/186 |
| 2002/0075813 | A1 * | 6/2002 | Baldonado et al. | 370/254 |
| 2002/0078223 | A1 * | 6/2002 | Baldonado et al. | 709/232 |
| 2003/0074467 | A1 * | 4/2003 | Oblak et al. | 709/238 |

FOREIGN PATENT DOCUMENTS

| | | |
|---|---|---|
| JP | 2000-155736 | 6/2000 |
| JP | 2000-244526 | 9/2000 |
| JP | 2000-259539 | 9/2000 |
| JP | 2001-53744 | 2/2001 |
| JP | 2001-94558 | 4/2001 |
| JP | 2001-216282 | 8/2001 |

OTHER PUBLICATIONS

RFC2516—A Method for Transmitting PPP over Ethernet (PPPoE).

* cited by examiner

F I G. 4
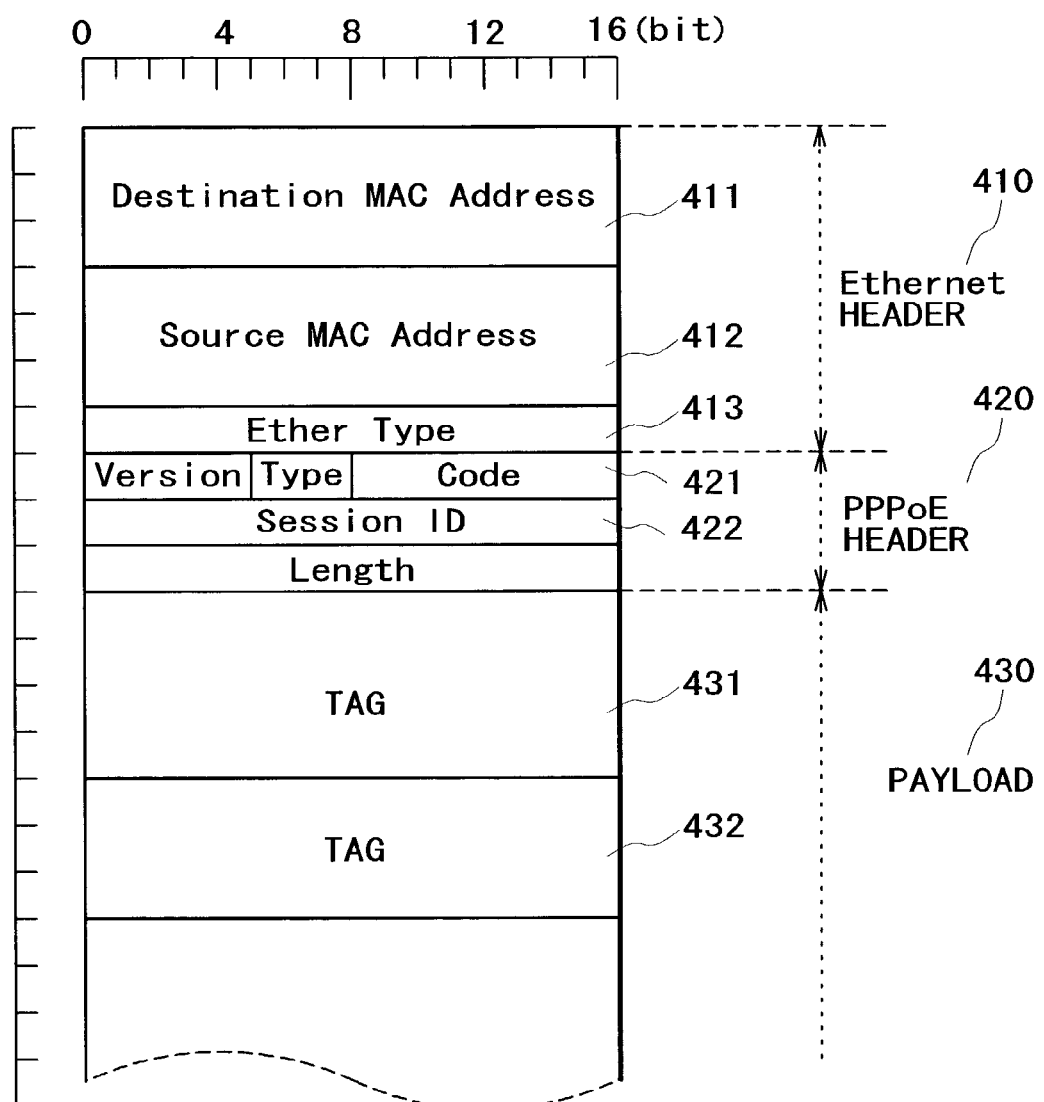

FIG. 8

| | MEANING | VALUE SET BY BAS 132 | VALUE SET BY BAS 133 |
|---|---|---|---|
| 900 TYPE OF INTER-SERVER COMMUNICATION INFORMATION | | | |
| 901 MAC ADDRESS OF PADO SENDING SERVER | MAC ADDRESS OF SERVER THAT SENT THE PADO MESSAGE | BAS 132 ADDRESS | BAS 133 ADDRESS |
| 902 PADO SENDING SERVER LOAD INFORMATION | LOAD INFORMATION OF SERVER THAT SENT THE PADO MESSAGE, AT THE TIME OF RECEIVING A CORRESPONDING PADI MESSAGE | L1 | L2 |
| 903 PADO SENDING SERVER TIME STAMP | TIME WHEN A SERVER THAT SENT THE PADO MESSAGE RECEIVED A CORRESPONDING PADI MESSAGE | T1 (≒ T2) | T2 (≒ T1) |

FIG. 14

| TYPE OF INTER-SERVER COMMUNICATION INFORMATION | MEANING | VALUE SET BY BAS 132 | VALUE SET BY BAS 133 |
|---|---|---|---|
| 1501 PADR DESTINATION SERVER IDENTIFIER | FOR CLIENT'S RESPONSE TO THE PADO MESSAGE, AN IDENTIFIER INDICATING A SERVER TO RECEIVE A CORRESPONDING PADR MESSAGE | BAS 132 ADDRESS | BAS 133 ADDRESS |
| 1502 PADO SENDING SERVER IDENTIFIER | IDENTIFIER INDICATING A SERVER THAT SENT THE PADO MESSAGE | BAS 132 | BAS 133 |
| 902 PADO SENDING SERVER LOAD INFORMATION | LOAD INFORMATION OF SERVER THAT SENT THE PADO MESSAGE, AT THE TIME OF RECEIVING A CORRESPONDING PADI MESSAGE | L1 | L2 |
| 1503 PADO SENDING SERVER SESSION ID LIST | SESSION ID LIST OF SESSIONS ESTABLISHED ON RELEVANT ATM VC OF A SERVER THAT SENT THE PADO MESSAGE, AT THE TIME OF RECEIVING A CORRESPONDING PADI MESSAGE | 0x1, 0x3 | 0x2 |
| 903 PADO SENDING SERVER TIME-STAMP | TIME WHEN A SERVER THAT SENT THE PADO MESSAGE RECEIVED A CORRESPONDING PADI MESSAGE | T1 (≒T2) | T2 (≒T1) |

| SERVER IDENTIFIER | LOAD INFORMATION | SESSION ID LIST |
|---|---|---|
| BAS 132 ADDRESS | L3 (>L4) | 0x1 |
| BAS 133 ADDRESS | L4 (<L3) | 0x2 |

PPPOE NETWORK SYSTEM THAT CAN DISTRIBUTE CONNECTION REQUESTS FROM PPPOE CLIENT TERMINALS TO SPECIFIC PPPOE SERVERS

BACKGROUND OF THE INVENTION

1. Field of the Invention

The present invention relates to a network system, and is particularly suitably applied to a PPPoE network system which has plural PPPoE servers and in which connection requests from PPPoE client terminals are distributed among PPPoE servers upon each occurrence of the requests.

2. Description of the Prior Art

PPPoE (PPP over Ethernet) is a client-server protocol proposed to transmit PPP (Point-to-Point Protocol) having been conventionally used for dialup connection and the like via analog telephone lines and ISDN lines over Ethernet (trademark). It is defined by RFC2516 "A method for Transmitting PPP Over Ethernet (PPPoE)" issued in February, 1999 by IETF (The Internet Engineering Task Force). PPPoE is in widespread use as a subscriber holding protocol in broadband access networks such as ADSL and FTTH, and is adopted, for example, in services such as FLET'S ADSL and B FLET'S provided as of November, 2001 by NTT local companies. East Japan Telegraph and Telephone Corporation created "Interface FLET'S Series of IP Communication Network Service—First Edition" in Oct. 17, 2001 as technical reference information on these services.

A PPPoE session establishment sequence (discovery stage) defined in the RFC2516 provides a framework by which, when plural PPPoE servers capable of communicating with PPPoE client terminals exist, the PPPoE client terminals select PPPoE servers of connection destinations.

FIG. 16 shows an example of a message sequence between PC 101 and BASes 132 and 133 when a session is established in conventional PPPoE.

According to the conventional technology, in e.g., PPPoE discovery stage between the PC 101 and BASes 132 and 133, processing comparable to current standard processing such as sequence processing defined in RFC2516 is performed.

The PC 101, which is a PPPoE client terminal, sends a PPPoE Active Discovery Initiation (PADI) message 701 to a broadcast MAC address. The PADI message 701 reaches the BASes 132 and 133, which are PPPoE servers, via a repeater 131, and is received by PADI receiving means 711 and 721. Session management table allocating means 712 and 722 allocate a session management table 643 for managing the sequence and register a Source MAC Address filed 412 in the PADI message 701 in the session management table 643 wherein the Source MAC Address filed 412 stores a MAC address value of the PC 101. The BAS 132 sends a PADO message 703 to the MAC address of PC 101 by a PADO sending means 713, and the Broadband Access Servers (BAS) 133 sends a PPPoE Active Discovery Offer (PADO) message 702 to the MAC address of PC 101 by a PADO sending means 723.

Although the PC 101 receives the two PADO messages 702 and 703, a connection destination selecting means 731 provided in the PC 101 selects either of BASes 132 and 133 to be connected to, according to the value of a service name TAG field contained in the PADO messages. In the example shown in FIG. 16, the PC 101 selects the BAS 133 as a connection destination. In this case, the PC 101 sends the PPPoE Active Discovery Request (PADR) message 704 to the MAC address of BAS 133.

The BAS 133 receives the PADR message 704 by a PADR receiving means 741. A session ID value unique between the PC 101 and the BAS 133 is created by a session ID creating means 742, and is registered in the session management table 643 allocated by the session management table allocating means 722 by a session management table updating means 743. A PADS message 740 with the session ID value set in a ID field 422 is sent to the MAC address of PC 101 by a PPPoE Active Discovery Terminate (PADS) message sending means 744 (the value of the session ID field 422 in the PADI, PADO, and PADR messages is 0x0). In this way, by sending and receiving the PADI, PADO, PADR and PADS messages that shuttle twice, the PPPoE discovery stage is completed between the PC 101 and BAS 133, and a PPPoE session is established.

On the other hand, in the BAS 132 that did not receive the PADR message, a timeout 751 occurs when a predetermined period of time elapses after the PADO message 703 was sent, and the session management table allocated by the session management table allocating means 712 to process the sequence is deallocated by a session management table deallocating means 752.

The establishment of the PPPoE session is followed by PPP negotiation 760. In the PPP negotiation 760, a PPP link is established (LCP), user authentication is made (CHAP or PAP), and an IP address is assigned to the PC 101 (IPCP). Upon completion of the PPP negotiation 760, IP communication 770 is enabled and the PC 101 is connected to the Internet 140.

In the above-described conventional technology by which a connection destination is selected under the initiative of PPPoE clients, access may concentrate on specific PPPoE servers, making it impossible to exploit the full capacity of the PPPoE servers and a network.

SUMMARY OF THE INVENTION

An object of the present invention is to provide a PPPoE network system that can distribute connection requests from PPPoE client terminals to specific PPPoE servers among plural PPPoE servers under the initiative of the PPPoE servers.

Another object is to guarantee that plural PPPoE sessions established among plural PPPoE servers are unique.

Another object is to exchange load information among plural PPPoE servers and achieve load distribution on a PPPoE session basis.

Another object is to achieve the load distribution so that, even if a new PPPoE server is installed or a PPPoE server in operation is halted, PPPoE servers adapt autonomously to a new configuration to enable continuous and appropriate load distribution.

The above-described objects are achieved so that changes to the PPPoE client terminals are not required, and means for achieving the objects are transparent to the PPPoE client terminals and subscribers.

To carry out the invention, in one aspect, we provide a network system that realizes a connection between at least one client terminal and plural servers at least by a connection start signal from the client terminal, a connection provision signal from the servers, corresponding to the connection start signal, and a connection request signal from the client terminal, corresponding to the connection provision signal; wherein the servers have an identification information setting means, upon receiving a connection start signal from the client terminal, for setting server identification information for identifying a specific server to receive a connection request signal corresponding the connection start signal in the connection provision signal.

In another aspect, we provide the network system that realizes connection between at least one PPPoE client terminal and plural PPPoE servers at least by a PADI message from the PPPoE client terminal, a PADO message sent from the servers, corresponding to the PADI message, and a PADR message sent the client terminal, corresponding to the PADO message; wherein MAC addresses used by the PPPoE servers for communications with the PPPoE client terminals are set to be different from each other, and the PPPoE servers have an identification information setting means, upon receiving a PADI message from the PPPoE client terminal, for setting the MAC address of a specific PPPoE server to receive a PADR message corresponding to the PADI message in the PADO message.

In still another aspect, we provide the network system that realizes connection between at least one PPPoE client terminal and plural PPPoE servers at least by a PADI message from the PPPoE client terminal, a PADO message sent from the servers, corresponding to the PADI message, and a PADR message sent the client terminal, corresponding to the PADO message; wherein MAC addresses used by the PPPoE servers for communications with the PPPoE client terminals are set to be identical with each other, and the PPPoE servers have an identification information setting means, upon receiving a PADI message from the PPPoE client terminal, for setting the server identifier of a specific PPPoE server to receive a PADR message corresponding to the PADI message in the PADO message.

In yet another aspect, we provide a server apparatus that realizes connection with at least one client terminal at least by a connection start signal from the client terminal, a connection provision signal from the server apparatus, corresponding to the connection start signal, and a connection request signal from the client terminal, corresponding to the connection provision signal; wherein the server apparatus receiving the connection start signal form the client terminal has an identification information setting means for setting server identification information for identifying a specific server apparatus to receive a connection request signal corresponding the connection start signal in the connection provision signal.

In further aspect, we provide a network system that realizes connection between at least one client terminal and plural servers at least by a connection start signal from the client terminal, a connection provision signal from the servers, corresponding to the connection start signal, and a connection request signal from the client terminal, corresponding to the connection provision signal; wherein the servers have an identification information setting means, upon receiving a connection start signal from the client terminal, for setting server identification information for identifying a specific server to receive a connection request signal corresponding the connection start signal in the connection provision signal. Therefore, among plural servers (e.g., PPPoE servers), connection requests from client terminals (e.g., PPPoE client terminals) can be distributed upon each occurrence of the requests under the initiative of the servers. Also, among plural servers, load distribution can be achieved on a session (e.g., PPPoE session) basis.

In the case where MAC addresses used by PPPoE servers for communications with identical PPPoE client terminals are set to be identical with each other, the PPPoE servers are provided with server identifiers unique among PPPoE servers having addresses different from the MAC addresses, PPPoE servers to receive a PADI message from a PPPoE client terminal are provided with a means for setting the server identifier of a PPPoE server to receive a PADR message corresponding to the PADI message in a PADO message and returning it to the PPPoE client terminal, and PPPoE servers to receive the PADR message are provided with a means for extracting the server identifier contained in the PADR message and a means for receiving the PADR message when the server identifier and their server identifier match as a result of comparison. Thereby, a specific PPPoE server specified by the PADO message can receive the PADR message.

In the case where MAC addresses used by PPPoE servers for communications with identical PPPoE client terminals are identical with each other, PPPoE servers to receive a PADI message from a PPPoE client terminal are provided with a means for setting a list of session ID values of all PPPoE sessions the servers are establishing on a LAN segment to receive the PADI message in a PADO message, and PPPoE servers different from those to send the PADO message are provided with a means for observing the PADO message flowing on the LAN segment, a means for extracting a list of the session ID values set in the PADO message, a means for storing the extracted list of the session ID values, and a means, when a PADR message is received to establish a new PPPoE session, for assigning a session ID value not overlapping the stored session ID values. As a result, it can be guaranteed that PPPoE sessions are unique on the LAN segment.

PPPoE servers to receive a PADI message from PPPoE client terminals are provided with a means for setting the MAC addresses or server identifiers of the servers, and load information of the servers in a PADO message, and PPPoE servers different from those which observe the PADO message are provided with a means for extracting the MAC address or server identifier and the load information set in the PADO message, a means for storing the extracted MAC address or server identifier and the load information, and a means for deciding a PPPoE server to receive a PADR message, based on the stored load information of the servers. Thereby, load distribution can be achieved among the PPPoE servers.

PPPoE servers mutually update load information each time they respond with a PADO message to a PADI message from PPPoE client terminals, whereby even if a new PPPoE server is installed or a PPPoE server in operation is halted, the PPPoE servers adapt autonomously to a new configuration to enable appropriate load distribution among the PPPoE servers in the new configuration.

At any instant except when PPPoE servers receive a PADI message from PPPoE client terminals, a PADO message can be sent to update load information stored by other PPPoE servers, or a PADI message can be sent to update load information of other PPPoE servers, stored by the own servers.

PPPoE servers to receive a PADI message from PPPoE client terminals are provided with a means for setting a time stamp indicating receive time of the PADI message in a PADO message and returning it to the PPPoE client terminals, and the PPPoE servers to receive the PADR message are provided with a means for extracting the time stamp contained in the PADR message, and a means for judging the PADR message invalid if receive time of the PADR message elapses more than a given period of time from time indicated by the time stamp. Thereby, meaningless processing based on invalid messages can be avoided.

PPPoE servers are provided with common encrypting/decrypting means so that PPPoE servers to send a PADO message apply the encrypting means to set various information as described above, and PPPoE servers to extract the various information from PADO and PADR messages apply the decrypting means, whereby the contents of the various information exchanged among the PPPoE servers can be concealed from the PPPoE client terminals.

Other and further objects, features and advantages of the invention will appear more fully from the following description.

BRIEF DESCRIPTION OF THE DRAWINGS

FIG. 4 is a format diagram of a PPPoE packet in the network shown in FIG. 1;

FIG. 8 illustrates the structure of inter-server communication information of the first embodiment;

FIG. 14 illustrates the structure of inter-server communication information of the second embodiment;

FIG. 15 illustrates the contents of the server information table of the first embodiment.

DETAILED DESCRIPTION OF THE PREFERRED EMBODIMENTS

Preferred embodiments of the present invention will be described with reference to the accompanying drawings.

Figure 1:
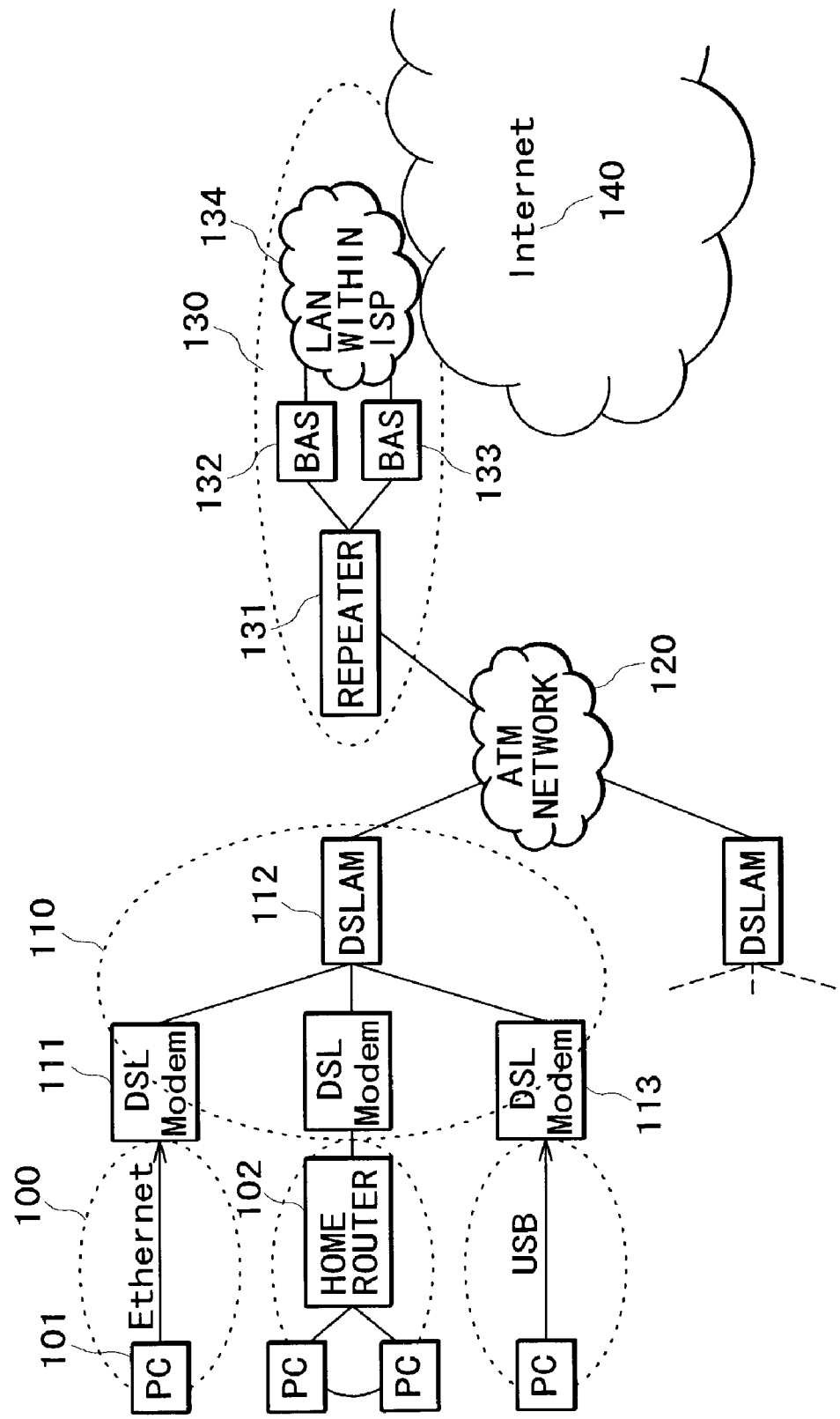
FIG. 1 is a configuration diagram of a network holding subscribers by a DSL network of an embodiment of the present invention.

FIG. 1 is a network configuration diagram showing an example of application of the present invention to a network holding subscribers by a DSL network.

DSL (Digital Subscriber Line) is a high-speed digital transmission system using telephone lines. In a subscriber holding system by DSL, DSL modems 111 installed in subscriber homes are connected with personal computers (PC) 101 by subscribers' Ethernet interfaces. A home router 102 is connected to the DSL modem and plural personal computers are connected to the home router 102 so that the plural PCs can be connected to a DSL line via the home router 102. If the DSL modem 113 has USB (Universal Serial Bus), it can be connected with a personal computer.

The DSL modems 111 are connected to telephone lines of subscriber homes through a common telephone line interface by a modular connector (RJ-11). DSLAM (DSL Access Multiplexer) 112 is installed in a telephone station side to hold DSL lines from plural subscriber homes. The DSLAM 112 has an ATM interface to a network constituted by an ATM network so that it is connected to the ATM network 120. The ATM network 120 connects the DSL network 110 and an ISP network 130.

A repeater 131 is installed at the entrance of the ISP network 130. The repeater 131 has an ATM interface through which the ATM network 120 and BAS (Broadband Access Servers) 132 and 133 are connected. The BASes 132 and 133 are connected to LAN 134 within ISP. In the LAN 134 within ISP, an authentication server, DNS server, Web server, Mail server, and the like are installed, providing various services including the connection of subscribers to Internet 140.

Figure 2:
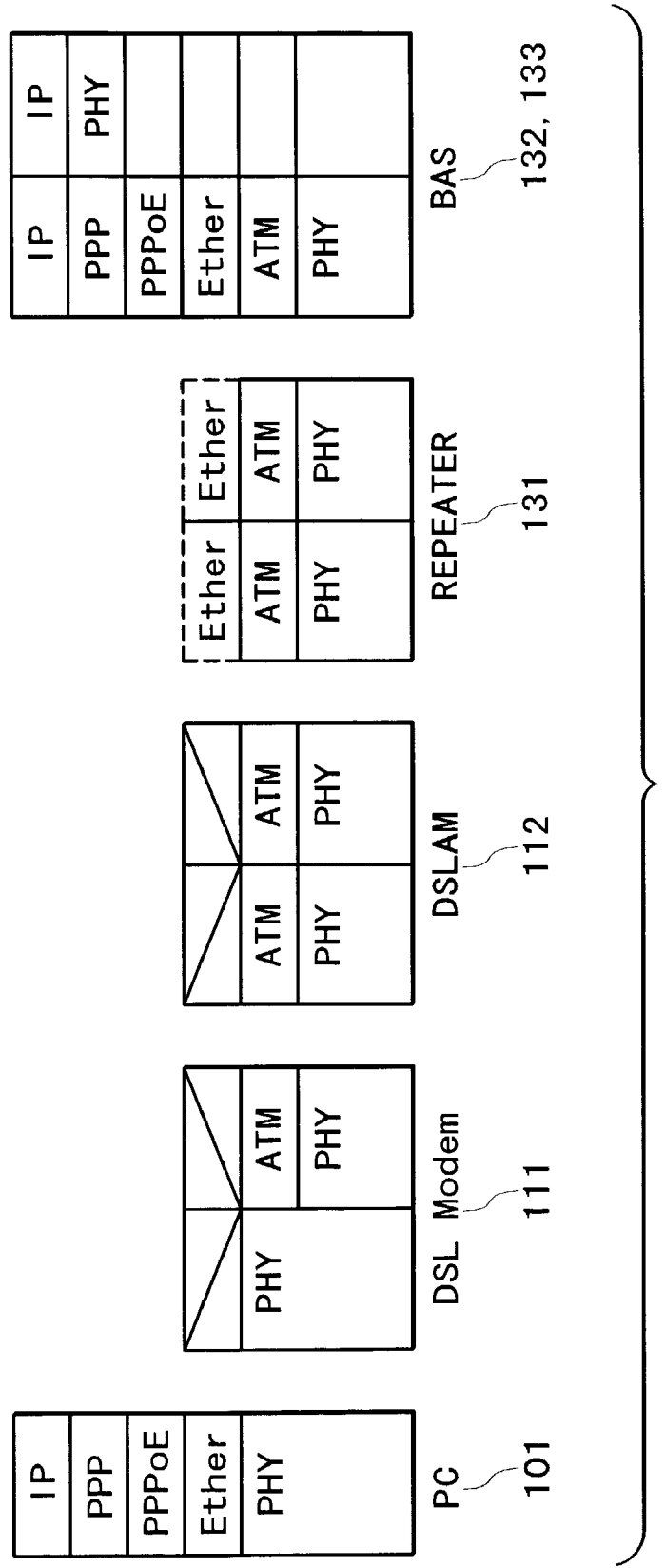
FIG. 2 is a protocol stack diagram in the network shown in FIG. 1.

FIG. 2 shows protocol stack in a segment from PC 101 to BASes 132 and 133.

The PC 101 functions as a PPPoE client terminal and establishes a PPPoE session and a PPP session with the BASes 132 and 133, and performs IP (Internet Protocol) communications with the Internet 140. The functions of PPPoE client, aside from being directly performed by PC, can be executed by other devices within subscriber home such as the home router 102 and DSL modem 111.

The BASes 132 and 133 has the functions of PPPoE servers. By establishing a PPPoE session and a PPP session with a client terminal of subscriber home such as PC 101, the BASes 132 and 133 connects the subscriber's PC 101 to the Internet 140 to provide Internet connection services.

Within the DSL network 110, ATM (Asynchronous Transfer Mode) is used on layer 2. The DSL modem 111 capsules an Ethernet frame received from the PC 101 to an ATM AAL 5 packet of RFC 1483 bridge format, and further converts it to an ATM cell to transfer it to DSLAM 112. The DSLAM 112 performs physical layer conversion from DSL to ATM, and transfers the ATM cell received from the DSL modem 111 to the ATM network 120 without modification. Within the ATM network 120, an ATM switch is disposed to perform a transfer at ATM cell level.

The repeater 131 performs relay at Ethernet frame level between the ATM network and the BASes 132 and 133. The repeater 131 has a function to group plural ATM VC (ATM Virtual Connection) to constitute a virtual LAN segment. An Ethernet frame received on a certain VC is broadcast to other all VCs belonging to an identical group.

For communications in a segment from the DSL modem 111 to BASes 132 and 133, ATM is used in layer 2. At higher ATM layers, Ethernet frames are transferred as ATM AAL 5 packets of RFC 1483 bridge format.

Figure 3:
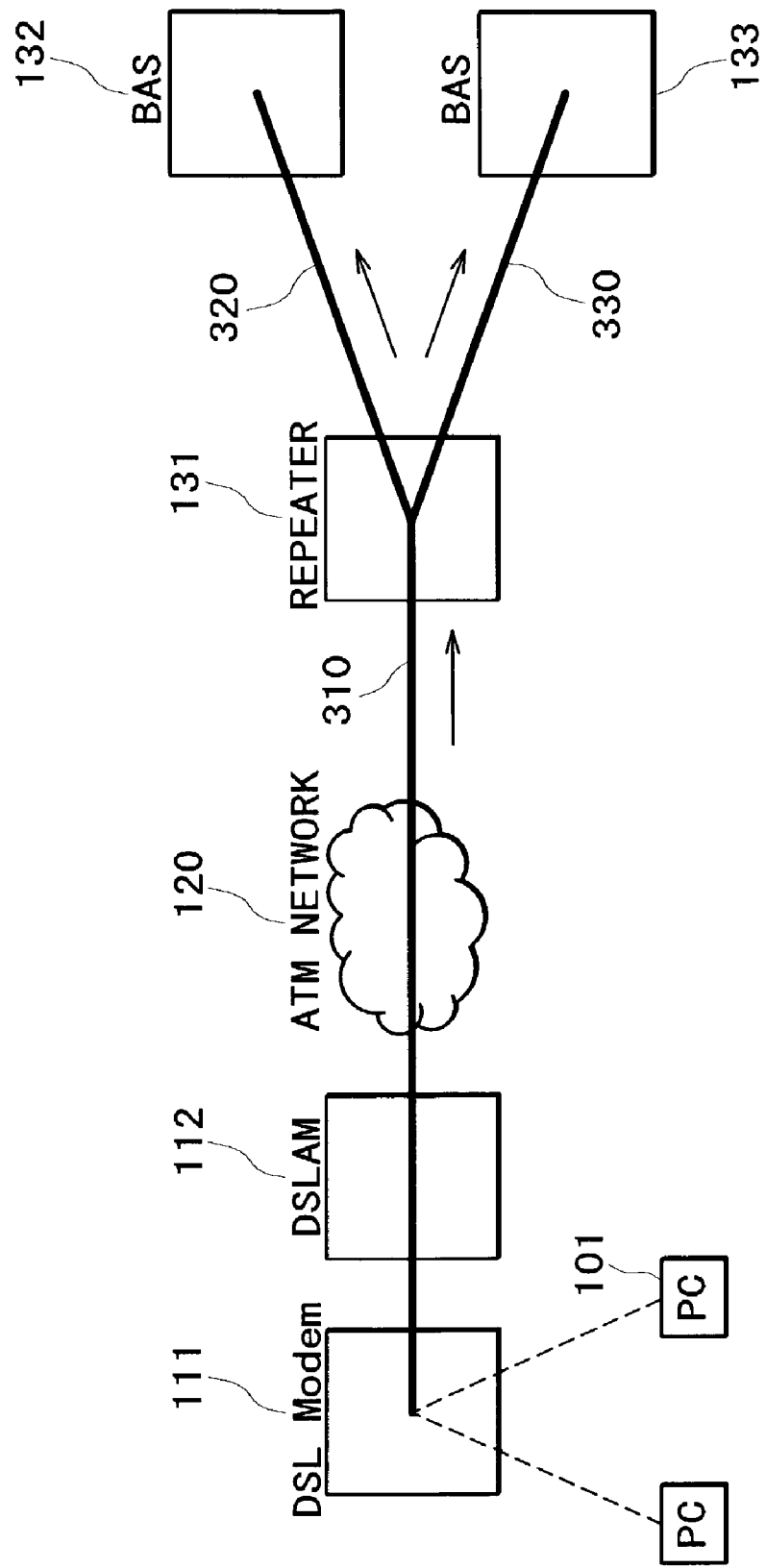
FIG. 3 illustrates ATM VC topology in the network shown in FIG. 1.

FIG. 3 shows ATM VC topology in this segment.

VC 320, 330, and 310 provided between the repeater 131 and the BASes 132 and 133, and between the repeater 131 and DSL modem 111 form one virtual LAN segment. Ethernet frames sent from the PC 101 are capsuled to AAL 5 packets of RFC 1483 bridge format in the DSL modem 111, and further converted to ATM cells to be sent onto the VC 310. The ATM cells are transferred without modification in the DSLAM 112 and ATM network 120 and arrive in the repeater 131. The repeater 131 restores AAL 5 packets from the ATM cells received on the VC 310 to take out Ethernet frames of higher layers. The Ethernet frames are sent to VC 320 and 330 belonging to the same virtual LAND segment as the VC 310. At this time, the Ethernet frames are again capsuled to AAL 5 packets of RFC 1483 bridge format and further converted to ATM cells.

The BASes 132 and 133 restores AAL 5 packets from ATM cells received on the VC 320 or 330 to take out Ethernet frames of higher layers. In this way, communications at Ethernet level are achieved between the PC 101 and BASes 132 and 133. The same is also true for communications from the BASes 132 and 133 to the PC 101.

BAS holds one subscriber by one ATM VC. Since a DSL modem is installed for each subscriber home, one VC is set from one DSL modem to each of BASes 132 and 133. In other words, each DSL modem is held in virtual Ethernet segments that are independent from each other. In this way, ISP (Internet Service Provider) can identify subscribers by ATM VC.

In the case where any of the DSL modem 111, DSLAM 112, and a device within the ATM network 120 functions as the repeater 131, without the repeater 131 being installed separately, a network can be formed that connects the BASes 132 and 133 directly to the ATM network 120.

FIG. 4 shows the data format of PPPoE packet defined in RFC2516.

The types of PPPoE packets are identified by the value of Ether Type field 413 in Ethernet header 410. The value of 0x8863 in the Ether Type field 413 indicates a discovery stage packet that is a message packet used when a PPPoE session is established or disconnected. The value of 0x8864 in the Ether Type field 413 indicates a session stage packet that is a data packet used when a session is being established.

The Ethernet header 410 is followed by PPPoE header 420. The types of discovery stage packets are identified by a code field 421 in the PPPoE header 420. Plural PPPoE sessions multiplexed on an identical line are identified by session ID field 422.

In a payload 430, for discovery stage packets, an information field called TAG is stored, and for session stage packets, a PPP frame is stored as a higher layer.

Figure 5:
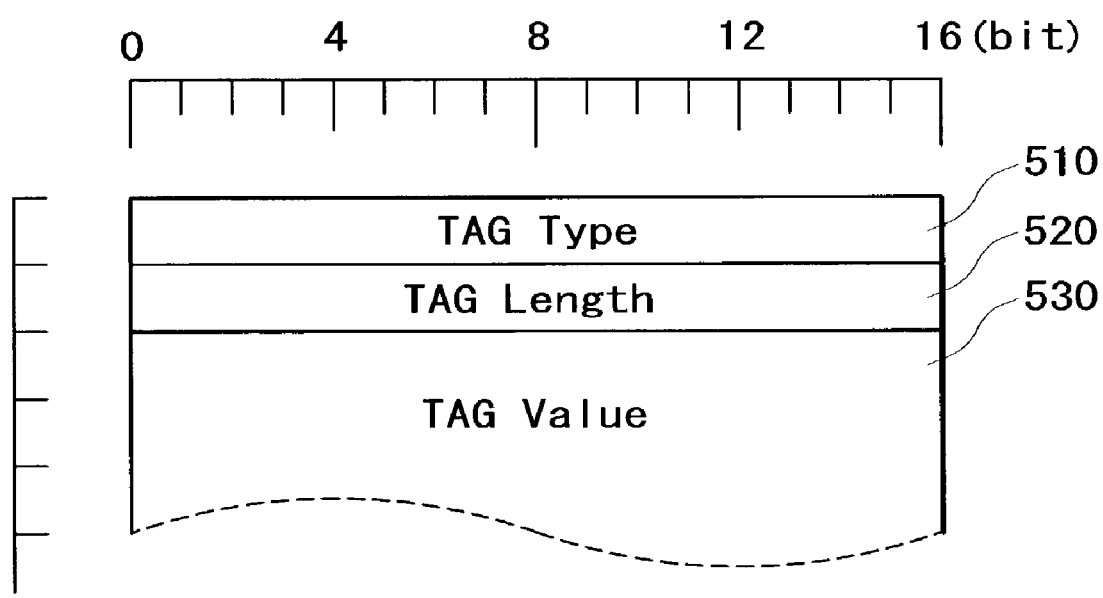
FIG. 5 is a format diagram of TAG stored in payload of the PPPoE discovery stage packet in the network shown in FIG. 1.

FIG. 5 shows the data format of TAG stored in the payload 430.

TAG is classified as Service#Name, AC#Name, AC#Cookie, and the like. The type of TAG is identified by TAG Type field 510. A TAG Value field 530 is a variable-length field for storing the value of TAG and the number of bytes of the field is identified by a TAG Length field 520.

Figure 6:
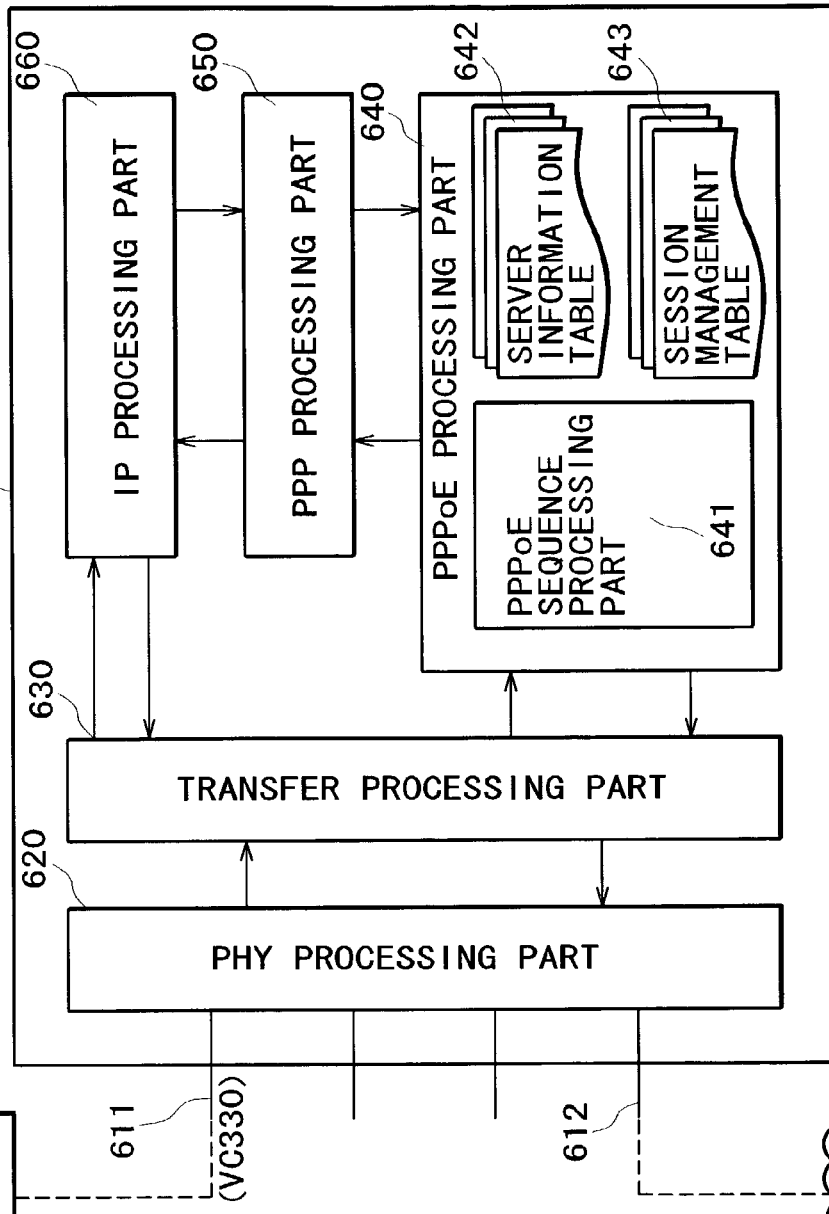
FIG. 6 is a configuration diagram of BAS of an embodiment of the present invention.

FIG. 6 shows a device configuration of BAS 133 for achieving a connection request distribution method of the present invention.

The BAS 132 may have the same configuration as the BAS 133 or have a different configuration for achieving the same functions as those of the BAS 133.

The BAS 133 has several network interfaces. An ATM port 611 is connected to the repeater 131 and VC 330 for holding communications from the PC 101 is set. A port 612, which is connected with LAN 134 within ISP, is an ATM interface or Ethernet interface, depending on the type of interface with the LAN 134 within ISP.

In a PHY processing part 620, a physical layer such as ATM and Ethernet (trademark) is terminated and MAC frames are taken out. For example, a PPPoE packet sent from the PC 101 is received as an ATM cell on the VC 330 of the ATM port 611, the ATM cell is restored to AAL 5 packet in the PHY processing part 620, and the PPPoE packet as shown in FIG. 4 is taken out. The PPPoE packet taken out is transferred to PPPoE processing part 640 via transfer processing part 630. PPPoE sequence processing part 641 processes discovery stage packets and achieves connection request distribution with other BAS. For example, when a PADI message is received from the PC 101, the PPPoE sequence processing part 641 creates a PADO message containing inter-server communication information 900 (see FIG. 8) described later and returns it to the VC 330 through the ATM port 611 via the transfer processing part 630. The PHY processing part 620 capsules the PADO message to AAL 5 packet and further converts it to ATM cell to send it onto the VC 330 of the ATM port 611.

The PPPoE processing part 640 comprises PPPoE sequence processing part 641, server information table 642, and session management table 643. The server information table 642 collects and holds information about BAS managed separately for each ATM VC (virtual LAN segment). The PPPoE sequence processing part 641 decides BAS to which connection requests from client terminals are distributed, and is used to create a unique session ID when a session is established. Details of a processing flow in the PPPoE sequence processing part 641 and the server information table 642 are given below.

The session management table 643 manages information about established PPPoE sessions, and a session stage packet is capsuled or decapsuled referring to the session management table 643. The session stage packet is transferred to PPP processing part 650 after Ethernet header 410 and PPPoE header 420 are removed in the PPPoE processing part 640. The PPP processing part 650 performs PPP negotiation (LCP, CHAP, PAP, IPCP, etc.) with a client terminal (e.g., PC 101) to establish a PPP session. After the PPP session is established, a data packet is transferred to IP processing part 660 after a PPP header is removed in the PPP processing part 650. The IP processing part 660 searches a routing table for a port of transfer destination by a Destination IP Address field. Based on the search result, the packer heading for the Internet 140 is transferred to the port 612 connected with LAN 134 within ISP via the transfer processing part 630. The IP packet is converted to a capsule for a physical layer corresponding to an interface type of port 612 in the PHY processing part 620, and is sent onto the port 612.

An IP packet heading for the PC 101 from the Internet 140 is received on the port 612 and is processed following a route of PHY processing party 620, transfer processing part 630, IP processing part 660, PPP processing part 650, PPPoE processing part 640, transfer processing part 630, and PHY processing part 620 in this order. In the IP processing part 660, the routing table is searched using the Destination IP Address field of IP header as key, and it is found that a logical line of the PC 101 of transfer destination is VC 330 on the ATM port 611. An IP packet heading for the PC 101 is capsuled with PPP header and further capsuled with PPPoE header 420 and Internet header 410 in the PPPoE processing part 640.

In this way, PPPoE sequence processing, PPP sequence processing, and IP packet transfer, and other functions are achieved in the BAS 133.

Figure 13:
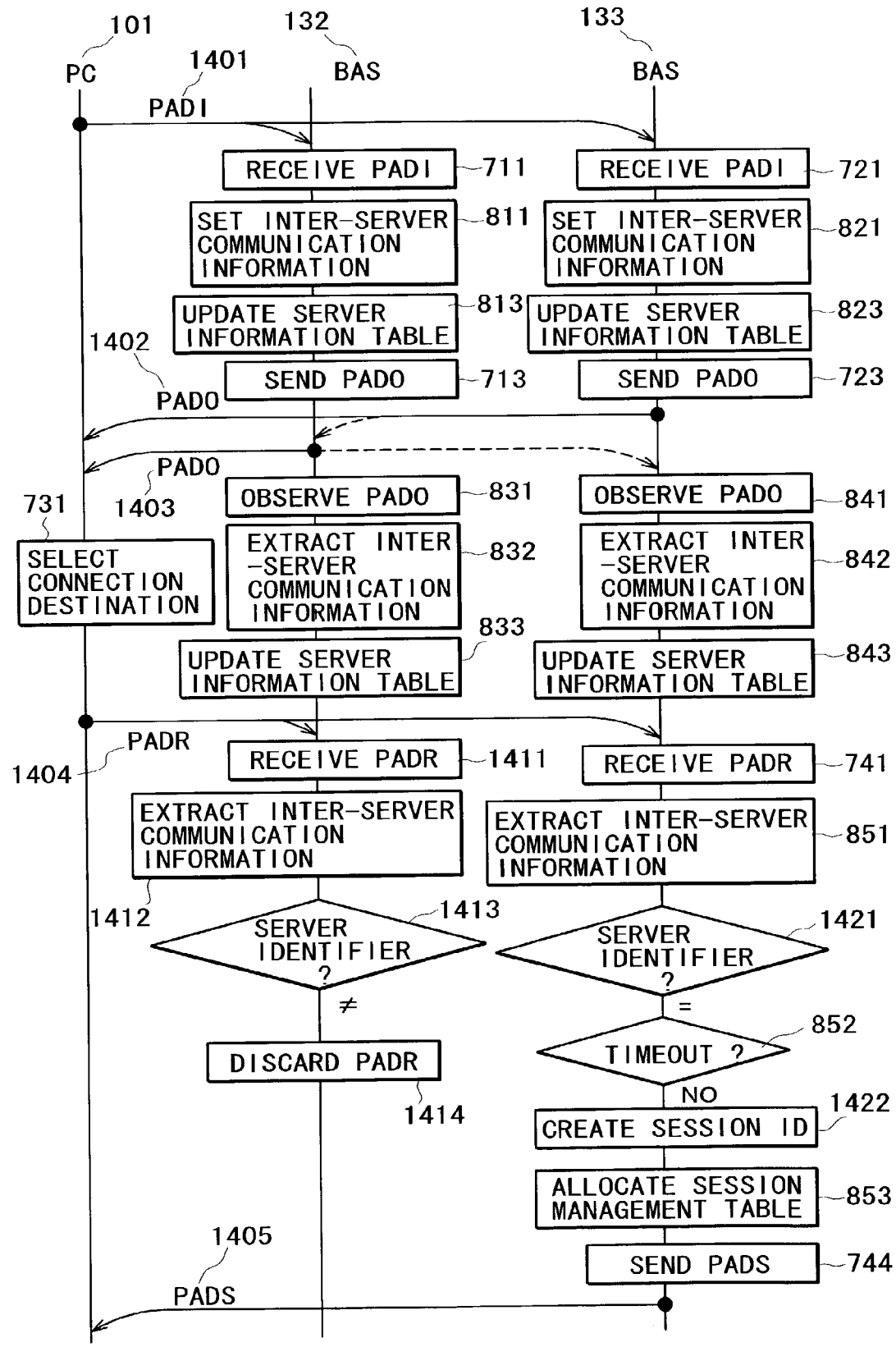
FIG. 13 is a sequence diagram of a PPPoE discovery stage of a second embodiment.

A description will be made of a message sequence between the PC 101 and the BASes 132 and 133, and processing in the PPPoE sequence processing part 641. A connection request distribution function according to the present invention is achieved in the PPPoE sequence processing part 641. Concrete methods for distributing connection requests are described for the case where the values of MAC addresses used for communications with the PC 101 are different for the BAS 132 and BAS 133 (FIG. 7), and the case where the MAC addresses have identical values (FIG. 13).

Figure 7:
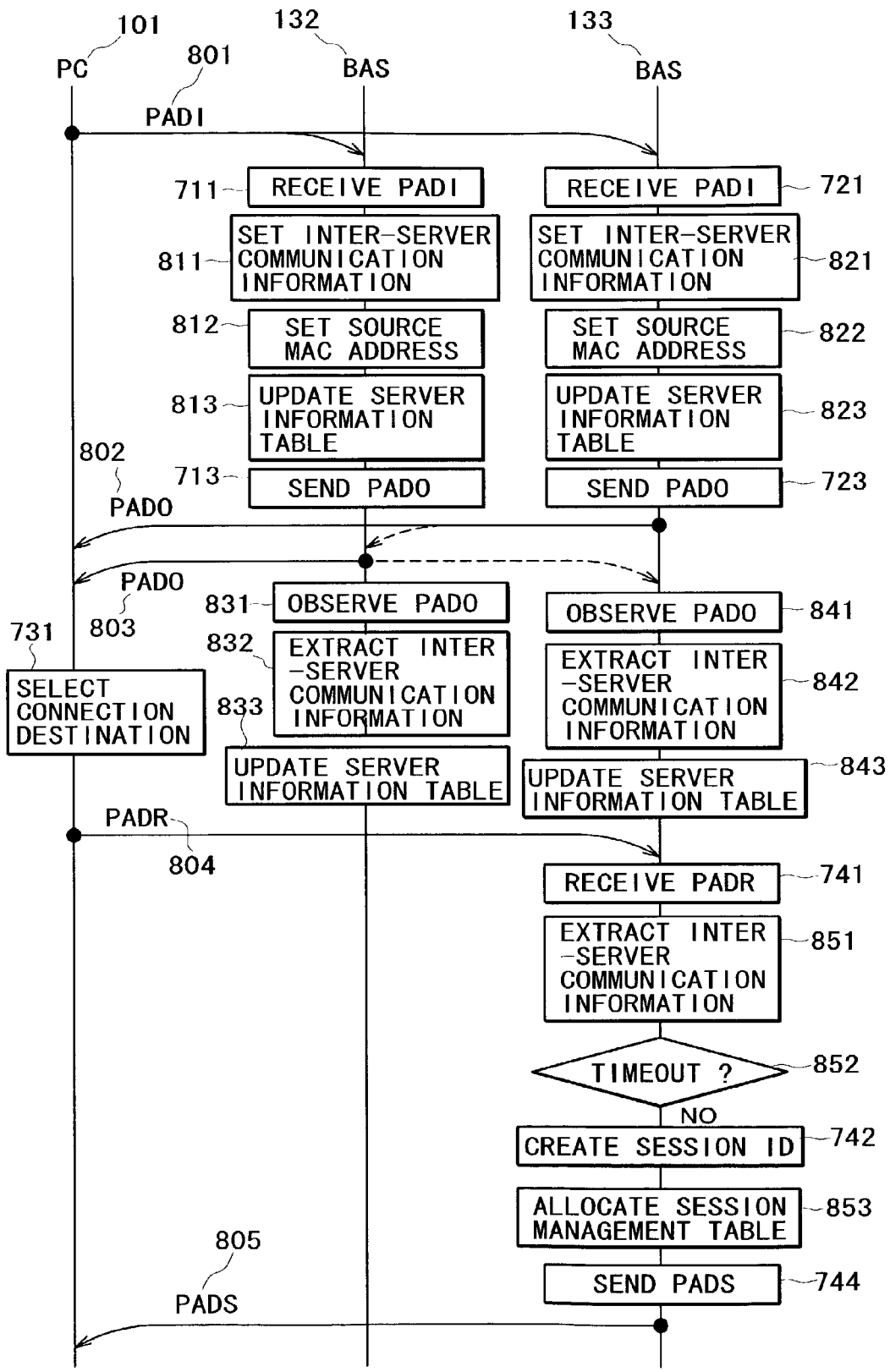
FIG. 7 is a sequence diagram of a PPPoE discovery stage of a first embodiment.

FIG. 7 shows an example (first embodiment) of a message sequence with the PC 101 and a processing procedure in the PPPoE sequence processing part 641 in normal cases where the BAS 132 and BAS 133 perform communications with different MAC addresses in a network configuration shown in FIG. 1. Earlier, a description is made of inter-server communication information 900 (FIG. 8) and the server information table 642 (FIG. 9) which are used in the BASes 132 and 133 in the message sequence shown in FIG. 7.

FIG. 8 shows the types of information constituting the inter-server communication information 900 and values set as the inter-server communication information 900 by the BASes 132 and 133.

The inter-server communication information 900 used in the message sequence of the first embodiment (FIG. 7) includes PADO sending server MAC address 901, PADO sending server load information 902, and PADO sending server time stamp 903. Of these items of information, the PADO sending server MAC address 901 and the PADO sending server load information 902 are set by PADO observing means 831 and 841. The PADO sending server time stamp 903 is set by the PADR receiving means 741. These items of information are set as inter-server communication information in a next cycle (811, 812).

The PADO sending server MAC address 901 is the MAC address of a server that sent the PADO message. To be more specific, a PADO message sent by the BAS 132 is set with the MAC address of the BAS 132, and a PADO message sent by the BAS 133 is stored with the MAC address of the BAS 133.

The PADO sending server load information 902 is load information of a server that sent the PADO message at the time of reception of a PADI message corresponding to the PADO message. To be more specific, the total number of PPPoE sessions established in the BAS, a processor use ratio of the BAS, a use ratio of packet transfer buffer, and the like are used.

The PADO sending server time stamp 903 is time when a PADI message corresponding to the PADO message was received by a server that sent the PADO message.

Figure 9:
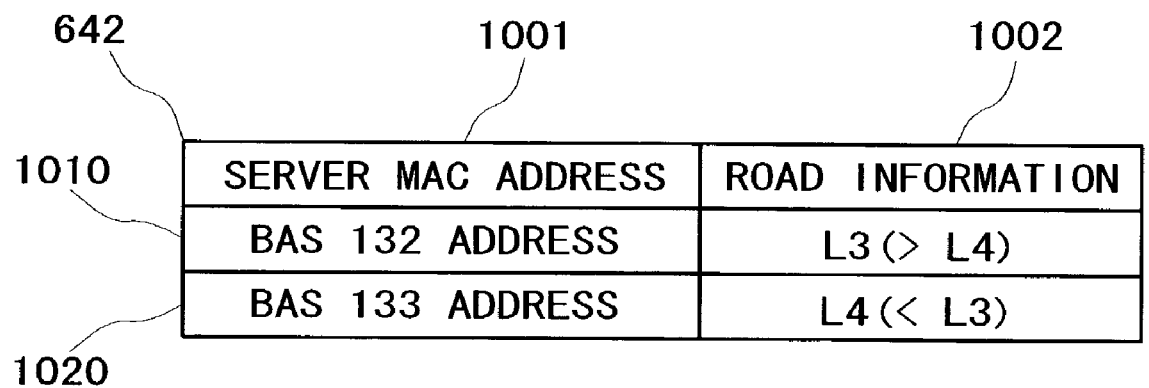
FIG. 9 illustrates the contents of a server information table of the first embodiment.

FIG. 9 shows the contents of the server information table 642 that the BASes 132 and 133 holds in the LAN segment during inter-server communication information setting 811 or 821.

The server information table 642, which consists of an entry for each server, holds entry 1010 of the BAS 132 and entry 1020 of the BAS 133 in the case of the first embodiment. Each entry consists of a server MAC address 1001 for uniquely identifying the server and load information 1002 of the server. As described later, since information of the server information table 642 is information collected by observing PADO messages sent by the BASes in the first preceding cycle, information shown in FIG. 9 is held in any of the BASes 132 and 133.

According to FIG. 7, a description is made of an example of a message sequence with the PC 101 and a processing procedure in the PPPoE sequence processing part 641 in normal cases where the BAS 132 and BAS 133 perform communications with different MAC addresses. FIG. 7 shows processing in one cycle from reception of a PADI message 801 from the PC 101 when the BAS 133 is less loaded than the BAS 132, to the establishment of PPPoE session by the BAS 133 to which connection requests are distributed.

When the PC 101 broadcasts the PADI message 801, the BASes 132 and 133 receive it by the PADI receiving means 711 and 721. The BASes 132 and 133 respond to the PADI message 801 with PADO messages 803 and 802, respectively. When the PADO messages are created, as the value of TAG Value of AC-Cookie TAG in the payload 430, inter-server communication information 900 is set by the inter-server communication information setting means 811 or 821.

Since connection requests are not distributed in the conventional sequence (FIG. 16), the Source MAC Address field 412 of PADO messages 703 and 702 sent from the BASes 132 and 133 is stored with their own MAC address values. However, in the first embodiment (FIG. 7), the Source MAC Address field 412 of the PADO message 803 and the Source MAC Address field 412 of the PADO message 802 are stored with the MAC address values of BASes to which connection requests are distributed, by Source MAC Address setting means 812 and 822. The Source MAC Address setting means 812 and 822 refer to the server information table 642 (see FIG. 9) to decide BASes to which connection requests are distributed, selects the entry of least loaded BAS (in the state of FIG. 4, since L4<L3, BAS 133 is less loaded and is selected), the server MAC address 1001 is set in the Source MAC Address field 412 of PADO message 803 and the Source MAC Address field 412 of PADO message 802.

After the Source MAC Address setting means 812 and 822 are executed, its own entry of the server information table 642 is updated to current information by server information table updating means 813 or 823 and other BAS entries are deleted. The PADO message 803 is sent by the PADO sending means 713 and the PADO message 802 is sent by the PADO sending means 723.

The PADO message 802 sent by the BAS 133 has a Destination MAC Address field 411 containing the MAC address value of PC 101, and is a unicast Ethernet frame directed to the PC 101. Physically, it is broadcast to the virtual LAN segment shown in FIG. 3. Accordingly, the BAS 132 can observe the PADO message 802 not directed to it by the PADO observation 831.

By inter-sever communication extracting means 832, inter-server communication information 900 stored in AC-Code TAG in the PADO message 802 by the BAS 133 is extracted. By server information table updating means 833, PADO sending server MAC address 901 and PADO sending server load information 902 are newly registered as server MAC address 1001 and load information 1002, like the entry 1020 of the server information table 642. The entry 1020 (server MAC address 1001 and load information 1002) is temporarily deleted by the server information table updating means 813. As described previously, since the entry 1010 is information of the BAS 132 itself, it is already updated by the server information table updating means 813.

In the same way in the BAS 133, the PADO message 803 sent by the BAS 132 can be observed by PADO observing means 841, and inter-server communication information extracting means 842 and server information table updating means 843 are executed. That is, since the PADO message sent by the BAS 132 is broadcast to a virtual LAN segment, the BAS 133 can observe the PADO message 803 not directed to it by the PADO observing means 841. Inter-server communication information 900 stored in AC-Cookie TAG in the PADO message 803 by the BAS 132 is extracted by the inter-server communication information extracting means 842. By the server information table updating means 843, PADO sending server MAC address 901 and PADO sending server load information 902 are newly registered as a server MAC address 1001 and load information 1002 like the entry 1010 of server information table 642. The entry 1010 (server MAC address 1001 and load information 1002) are temporarily deleted by the server information table updating means 823. As described previously, since the entry 1020 is information of the BAS 133 itself, it is already updated by the server information table updating means 813. As a result, the server information table 642 of the BASes 132 and 133 holds again the same information.

In this way, the new entries registered in the server information table 642 are used by the Source MAC Address setting means 812 and 822 to decide BAS to which connection requests are distributed, in a next cycle.

The PC 101 receive two PADO messages 802 and 803, which both contain the MAC address value of BAS 133 in the Source MAC Address field 412. The PC 101 decides to which of the PADO messages it should respond by existing connection destination selecting means 731 complying with the RFC2516, and sends a PADR message 804. Even if the PADR message 804 responds to any of the PADO messages, since the MAC address value of BAS 133 is set in the Destination MAC Address field 411, the PADR message 804 is received by the BAS 133.

According to the RFC2516 specifications, a client terminal must respond to a PADO message containing AC-Cookie TAG with a PADR message without changing the received AC-Cookie TAG. Accordingly, the PADR message 804 unchangeably stores the AC-Cookie TAG in which inter-server communication information 900 is set by the inter-server communication information setting 811 or 821. Upon receiving the PADR message 804 by the PADR receiving means 741, the BAS 133 extracts the inter-server communication information 900 contained in the AC-Cookie TAG by inter-server communication information extracting means 851. Timeout judging means 852 compares PADO sending server time stamp 903 of the inter-server communication information 900 with time when the BAS 133 received the PADR message 804, and if the elapsed time is greater than or equal to a given value, judges the PADR message 804 invalid and discards the received PADR message 804.

If the comparison between the PADO sending server time stamp 903 and the time when the PADR message 804 was received does not indicate timeout, the BAS 133 creates a unique session ID value by the session ID creating means 742. Session management table allocating means 853 allocates a session management table 643 for managing the session and registers the Source MAC Address filed 412 (in which the MAC address value of PC 101 is stored) of the PADR message 804 and the session ID in the session management table 643. The PADS message 805 is sent by the PADS sending means 744 and a PPPoE session is established between the PC 101 and BAS 133.

In the conventional sequence (FIG. 16), since the session management table 643 allocated by the session management table allocating means 712 is unnecessary in the BAS 132 that did not receive a PADR message, it has been necessary to deallocate a session management table allocated for sequence processing for session failure due to timeout. However, in the first embodiment (FIG. 7), since the session management table 643 is not required to manage the PPPoE discovery stage sequence and is not allocated until a PADR message is received and a session is established, in the BAS 132 that did not receive a PADR message, resource deallocation processing is not performed and only transition of internal states as described later in FIG. 10 takes place.

Although two BASes are installed in the first embodiment, also in the case where three or more BASes are installed, since the plural BASes respond to a PADI message from a client terminal (PC 101) with a PADO message storing the inter-server communication information 900, each BAS can collect information of all other BASes by observing PADO message sent from other BASes.

In the first embodiment, the inter-server communication information 900 is stored in AC-Cookie TAG in a PADO message. This is because PADO sending server time stamp 903 is included in a PADR message according to the RFC2516 specifications that a client terminal must respond to the PADO message with the PADR message without changing the AC-Cookie TAG. Although AC-Cookie TAG is defined to store a value created from the MAC address of a client terminal in TAG Value field 530, details are not defined and the client terminal has no concern in its contents. There-fore, it is convenient to use AC-Cookie TAG to store inter-server communication information.

For example, inter-server communication information 900 set in AC-Cookie TAG of a PADO message 803 by the inter-server communication information setting 811 of BAS 132 is extracted by the inter-server communication information extracting means 842 and 851. That is, since these items of information is extracted by BASes different from BAS to set the inter-server communication information 900, a format common among the BASes is used for the TAG Value field 530 of AC-Cookie TAG in which the inter-server communication information 900 is stored. To store plural items of information shown in FIG. 8, like the format of TAG shown in FIG. 5, TLV format having TAG Type field, TAG Length field, and TAG Value field can be used.

Inter-server communication information 900 is information that does not need to be disclosed to client terminals. To prevent malicious client terminals from decoding the inter-server communication information 900, encrypting/decrypting means common to the BASes can be provided. That is, the BASes have common key for encryption and decryption. For example, in the PADO message 803, the inter-server communication information setting means 811 of BAS 132 encrypts the inter-server communication information 900 of TLV format with common encryption key and sets the result in the TAG Value field 530 of AC-Cookie TAG. The inter-server communication information extracting means 842 and 851 of BAS 133 can extract the inter-server communication information 900 of TLV format by decrypting the TAG Value field 530 of AC-Cookie TAG in the PADO message 803 with the common key.

PADO sending server MAC address 901 and PADO sending server load information 902 of the inter-server communication information 900 are extracted in such a way that BASes different from a BAS sending a PADO message observe the PADO message; they may not be contained in a PADR message. For example, original TAG not defined in the RFC2516 is defined in the TAG Type field 510, and PADO sending server MAC address 901 and PADO sending server load information 902 may be stored in the TAG. According to the RFC2516, since unknown TAGs must be ignored, client terminals are not badly affected by using TAGs newly defined.

Although not defined in the RFC2516, some client terminals are configured to return Service-Name TAG and AC-Name TAG contained in a PADO message, as well as AC-Cookie TAG without modification by a PADR message. As a preferred embodiment of such client terminals, inter-server communication information maybe stored in Service-Name and AC-Name TAG.

Figure 10:
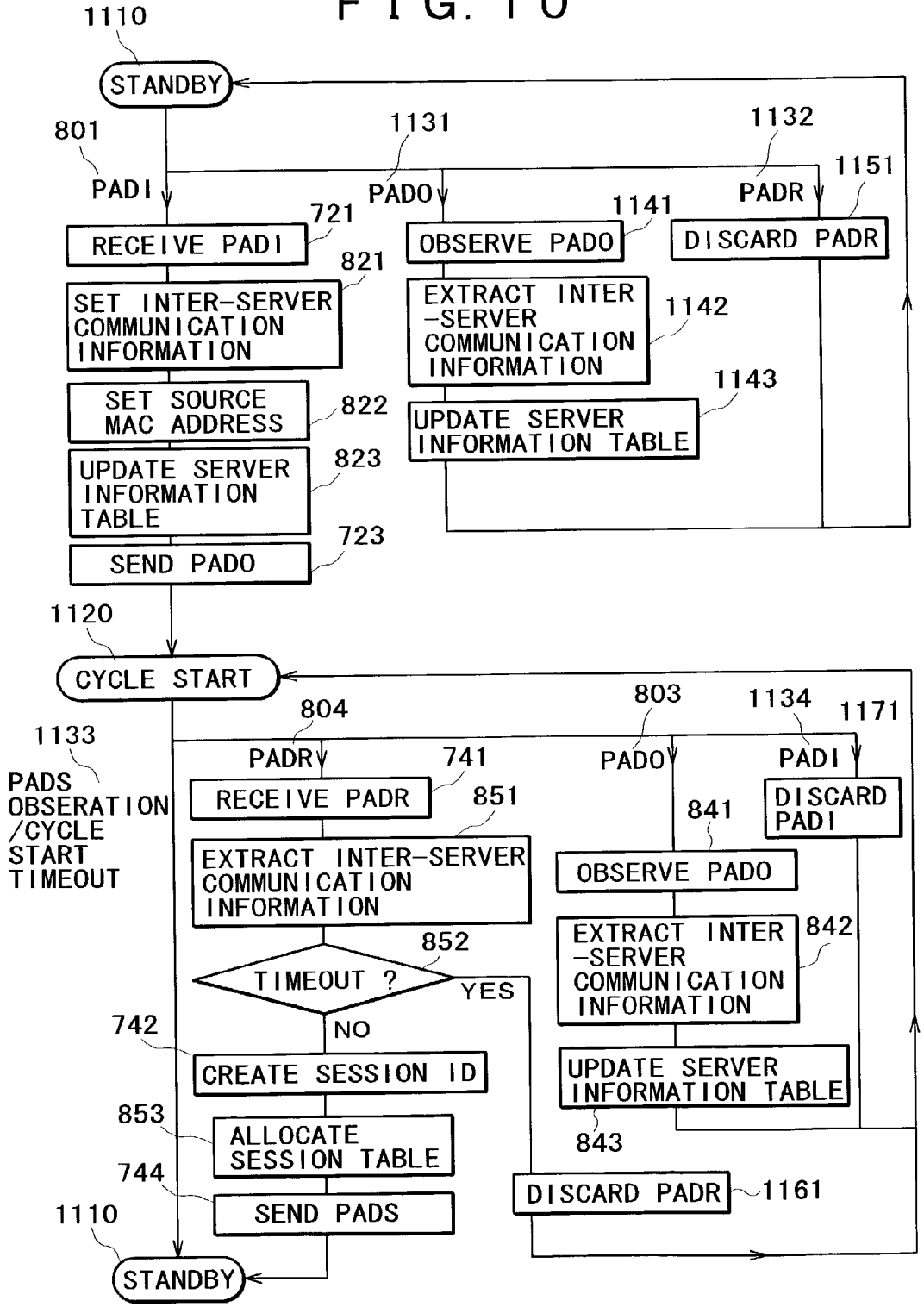
FIG. 10 is a flowchart showing processing of PPPoE sequence processing part of the first embodiment.

FIG. 10 is a flowchart of processing performed in the PPPoE sequence processing part 641 of the BAS 133 in the sequence shown in the first embodiment (FIG. 7) described previously. Processing of a similar procedure is performed in the BAS 132 also.

The PPPoE sequence processing part 641 has standby state 1110 and cycle start state 1120.

When a PADI message 801 from PC 101 is received in the standby state 1110, a series of PADI processing steps (concretely, processing consisting of PADI reception 721, inter-server communication information setting 821, Source MAC Address setting 822, server information table updating 823, and PADO sending 723 in this order as described in FIG. 7) beginning with PADI reception 721 is performed, and transition to cycle start state 1120 occurs.

When a PADO message 1131 from other BAS is observed in the standby state 1110, as in the case where it is observed in the cycle start state 1120, a series of PADO processing steps (concretely, the same processing as PADO observation 841, server information extraction 842, and server information table updating 843 in this order as described in FIG. 7) beginning with PADO observation 1141 is performed. The standby state 1110 is maintained. This, as described later, enables a variant of the embodiment that a PADO message is sent to exchange load information among BASes, in addition to the case of responding to a PADI message.

When a PADR message 1132 from a client terminal is received in the standby state 1110, the PPPoE sequence processing part 641 performs no operation and the received PADR message 1132 is discarded by PADR discard processing 1151. The standby state 1110 is maintained. This is because, even if a PADR message not received between the standby state 1110 and the cycle start state 1120 is received subsequently, the PADR message received late loses time effectiveness. Also, this is done to prevent a client terminal from making a connection request by abruptly sending a PADR message without taking the step of sending a PADI message and receiving a PADO message.

On the other hand, when a PADS message 1133 sent by other BAS is observed in the cycle start state 1120, or a timeout occurs when a predetermined period of time elapses after transition to the cycle start state 1120, the PPPoE sequence processing part 641 shifts to the standby state 1110.

When a PADR message 804 from PC 101 is received in the cycle start state 1120, a series of PADR processing steps (concretely, processing consisting of PADR reception 741, inter-server communication information extraction 851, timeout confirmation 852, session ID creation 742, session management table allocation 853, and PADS sending 744 in this order as described in FIG. 7) beginning with the PADR receiving means 741 is performed, a session with the PC 101 is established, and the PPPoE sequence processing part 641 shifts to the standby state 1110.

When a PADO message 803 sent from BAS 132 is observed in the cycle start state 1120, a series of PADO processing steps (concretely, processing consisting of PADO observation 841, server information extraction 842, and server information table updating 843 in this order as described in FIG. 7) beginning with PADO observation 841 by the PADO observing means is performed. For the duration of execution of the series of PADO processing steps, the cycle start state 1020 is maintained.

When a PADI message 1134 from a client terminal is received in the cycle start state 1120, the PPPoE sequence processing part 641 performs no operation and the received PADI message 1134 is discarded by PADI discard processing 1171. The cycle start state 1120 is maintained. This is done to prevent the situation in which, when PADI messages are continuously sent from malicious client terminals, a PADI processing procedure consisting of steps 821 to 823, and 723 is activated, causing extra processing loads. Also, this is done to facilitate the management of the server information table 642 by preventing multiple activation of cycles and prevent mismatch from occurring in sever information.

According to the operation shown in FIGS. 7 and 10, information is exchanged between BASes using PADO messages, and the server information tables 642 they have are updated every cycle. By this arrangement, even if BAS is newly added or BAS in operation is halted, a flexible load distribution system is realized which enables the BASes to adapt autonomously to a new configuration. A description is made below of processing when BAS is added or halted.

Figure 11:
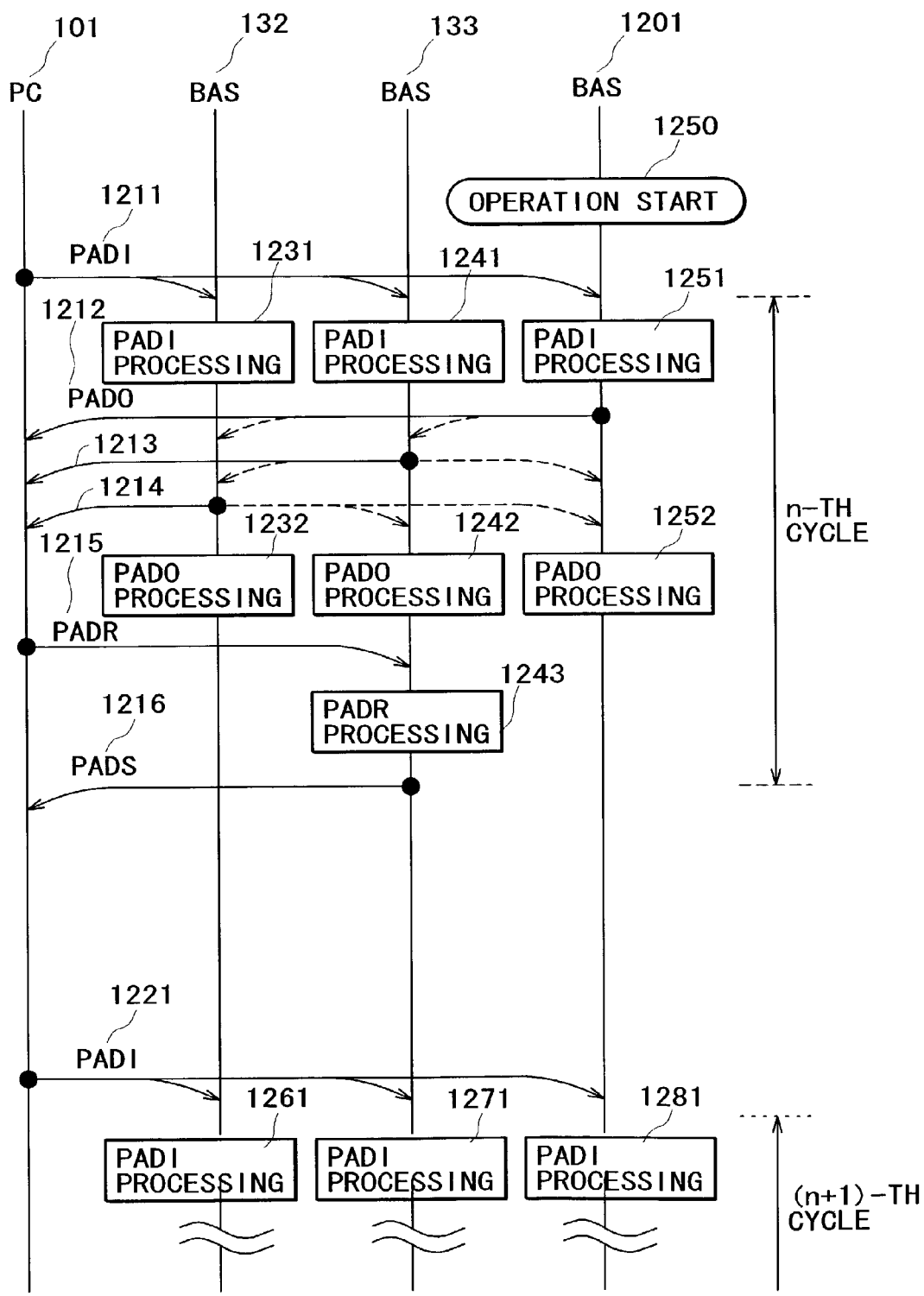
FIG. 11 is a sequence diagram in the case where a BAS is newly installed in the first embodiment.

FIG. 11 shows a sequence when a third BAS 1201 is newly installed while two BASes 132 and 133 are in operation. In an embodiment shown in FIG. 11, when PADI, PADO, and PADR messages are received, processing shown in FIG. 7 is performed in the BASes. In FIG. 11, these processings are simply referred to as PADI processing, PADO processing, and PADR processing, respectively. A first cycle started by the PC 101 sending a PADI message 1211 after operation start 1250 of the BAS 1201 is defined as n-th cycle.

The PADI message 1211 sent by the PC 101 is received by the BASes, where PADI processing steps 1231, 1241, and 1251 are respectively executed. Since the entry of BAS 1201 does not exist in the server information tables 642 (see FIG. 9) of the BASes 132 and 133 at this point in time, the MAC address value of BAS 133 is set in the Source MAC Address fields 412 of PADO messages 1213 and 1214. On the other hand, since the entries of the BASes 132 and 133 do not exist in the server information table 642 of BAS 1201, the PADO message 1212 is stored in the Source MAC Address field 412 with the MAC address value of BAS 1201 itself.

The PC 101 receives three PADO messages 1212, 1213, and 1214 and responds to one of them with a PADR message 1215. If it responds to the PADO message 1213 or 1214, a session with the BAS 133 is established, and if it responds to the PADO message 1212, a session with the BAS 1201 is established. FIG. 11 shows a sequence in which the PC 101 selects the BAS 133 and returns PADR, and the BAS 133 sends PADS, whereby a session with the BAS 133 is established.

The BASes observe PADO messages sent from other BASes by PADO processing steps 1232, 1242, and 1252, and update their server information tables. Therefore, at the time of completion of n-th cycle, a server information table of each BAS is registered with information of the three BASes 132, 133, 1201 including the BAS. Hence, in (n+1)-th cycle started by receiving a next PADI message 1221, since a connection request from the PC 101 is distributed to a BAS having the smallest load information by the PADI processing steps 1261, 1271, and 1281, load distribution is correctly made among the three BASes.

Figure 12:
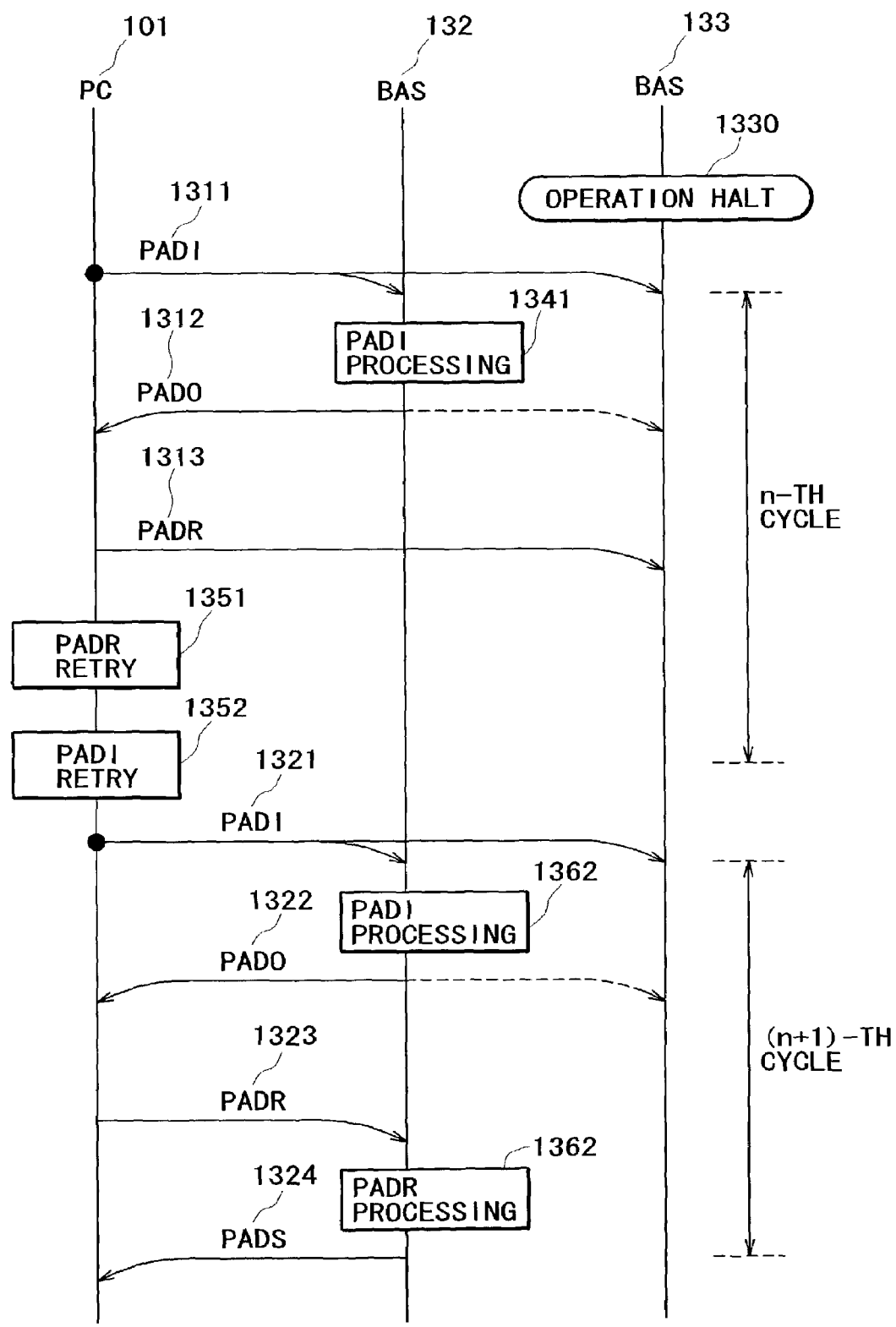
FIG. 12 is a sequence diagram in the case where a BAS in operation is halted in the first embodiment.

FIG. 12 shows a processing sequence when the BAS 133 is halted for the reason of maintenance operation or apparatus fault when the two BASes 132 and 133 are in operation. In FIG. 12, a first cycle started by the PC 101 sending a PADI message 1311 after operation halt 1330 of the BAS 133 is defined as n-th cycle.

Although the BAS 132 receives a PADI message 1311, since the entry 1020 of BAS 133 exists in the server information table 642 (see FIG. 9), the BAS 132 responds with a PADO message 1312 stored in the Source MAC Address field 412 with the MAC address value of BAS 133. The entry of BAS 133 is deleted by server information updating means in a PADI processing step 1341 executed between PADI reception and PADO sending.

Since the BAS 133 is halted, only a PADO message 1312 from the BAS 132 is sent to the PC 101.

Upon receiving the PADO message 1312, the PC 101 responds with a PADR message 1313 stored in the Destination MAC Address field 411 with the MAC address value of BAS 133. However, since the PADR message 1313 is not received by the BAS 133 halted, the PC 101 cannot receive a PADS message in the n-th cycle and session establishment fails.

The RFC2516 specifies that, if a client terminal that could not receive a PADS message cannot still receive the PADS message after resending a PADR message several times, it should begin with the sending of a PADI message again. According to this specification, the PC 101 resends the PADR message by PADR retry means 1351 but cannot still receive the PADS message, and therefore resends the PADI message 1321 by PADI retry means 1352. The PADI message 1321 is received by the BAS 132 and (n+1)-th cycle is started. However, the entry 1020 of BAS 133 is already deleted from the server information table 642 of BAS 132. This is because, since the BAS 133 is halted in the n-th cycle, the BAS 132 cannot obtain information of the BAS 133 by observing the PADO message and the entry 1020 of BAS 133 of the server information table 642 is left deleted by the server information updating means in the PADI processing step 1341.

Accordingly, the PADO message 1322 sent by the BAS 132 in the (n+1)-th cycle is stored in the Source MAC Address filed 412 with the MAC address value of BAS 132 itself by the PADI processing step 1361. Upon receiving the PADO message 1322, the PC 101 responds with a PADR message 1323 stored in the Destination MAC Address field 411 with the MAC address value of BAS 132. The PADR message 1323 is received by a PADR processing step 1362 in the BAS 132, a PADS message 1324 is sent, and a session is established.

In this way, when a BAS in operation is halted, if the halted BAS is low loaded and is a destination to which a connection request is distributed, two cycles are required until a session is established. However, since the PADR retry means 1351 and the PADI retry means 1352 in the PC 101 are automatically executed by software providing PPPoE client functions, and users are aware of nothing except that session establishment requires only a little time, the service itself of accommodating subscribers is not badly affected and the system can operate continuously as a whole.

As described above, in the first embodiment, a flexible load distribution system is realized which enables autonomous adaptation to changes in system configuration during operation. This is because since information is exchanged between BASes for each operation by use of PADO messages, changes in system configuration are immediately reflected in the server information table 642 of each BAS. According to the first embodiment, information of mutual BASes need not be registered in advance in each BAS, and a specific management apparatus for allowing the BASes to operate in coordination with each other is not required. As the result of the BASes operating on an equality with each other and autonomously, the server information tables 642 of the BASes can be kept equal with each other.

In the first embodiment (FIGS. 7 to 12) described above, the value of Source MAC Address filed 412 set by the Source MAC Address setting means 812 and 822 is decided by referring to the server information table 642 and selecting the server MAC address 1001 of an entry that is the smallest in load information 1002. Therefore, the load information 1002 was information collected in a preceding cycle. In the passive operation of the first embodiment of exchanging load information, triggered by the sending of a PADI message by a client terminal, a time difference from a preceding cycle may occur, and differences between load information 1002 held in the server information table 642 and current load status may become large.

Hereinafter, a description is made of a variant of the first embodiment for preventing the situation in which load information 1002 held in the server information table 642 becomes obsolete and mismatch with current load status occurs. In this embodiment, in addition to basic operations of the first embodiment, besides the case of responding to a PADI message, a PADO message is sent to exchange load information between BASes. Since the PADO message intended to exchange load information is not intended to respond to a PADI message from a client terminal, e.g., their own MAC address value is set in the Destination MAC Address field 411 so that operation of the client terminal is not badly affected. The PADO message is observed by other BASes like normal PADO messages 802 and 803, and the server information table 642 is updated. For example, as shown by the flowchart of FIG. 10, also in the case where a PADO message 1131 is received when the BAS 133 is in standby state 1110, a series of PADO receive steps beginning with PADO observing means 1141 is performed. The PADO message intended to exchange load information is sent periodically or when its own actual load status changes beyond a predetermined limit from its own load information 902 held in the server information table 642.

In another embodiment variant, to collect information of other BASes, a certain BAS sends a PADI message to have the other BASes respond with a PADO message. This embodiment is effectively applied to initiate a new BAS added to a system already in operation, for example, as shown in FIG. 11.

In another embodiment variant, BAS to update information of a specific BAS sends a PADI message specifying the MAC address value of the specific BAS in the Destination MAC Address field 411 so that only the specific BAS is responded with a PADO message. In this embodiment, the server information table 642 is registered with PADO sending server time stamp 903, in addition to the information shown in FIG. 9. If a given time period elapses from time indicated by the time stamp, judging information of the relevant entry obsolete, a PADI message is sent to a corresponding BAS.

In an embodiment variant in which values used as load information are values of apparatus unit, an independent server information table 642 is not used for each of ATM VCs (virtual LAN segments) to manage load information but a single load information table is provided aside from the server information table 642. Thereby, even if a PADO message is observed on any ATM VC, since a common load information table is updated, load information is more frequently updated in comparison with the case where load information is managed by a different server information table 642 for each of different VCs, with the result that load information is kept more recent. Since less information is required to manage the server information table 642, the amount of memory required to hold the table can be reduced. In such an embodiment, as load information, for example, the total number of PPPoE sessions established in a particular BAS is used.

Likewise, in an embodiment variant in which values used as load information are values of each of specific units constituting an apparatus, such as a network card unit and interface unit, a load information table on a unit basis is provided.

Figure 16:
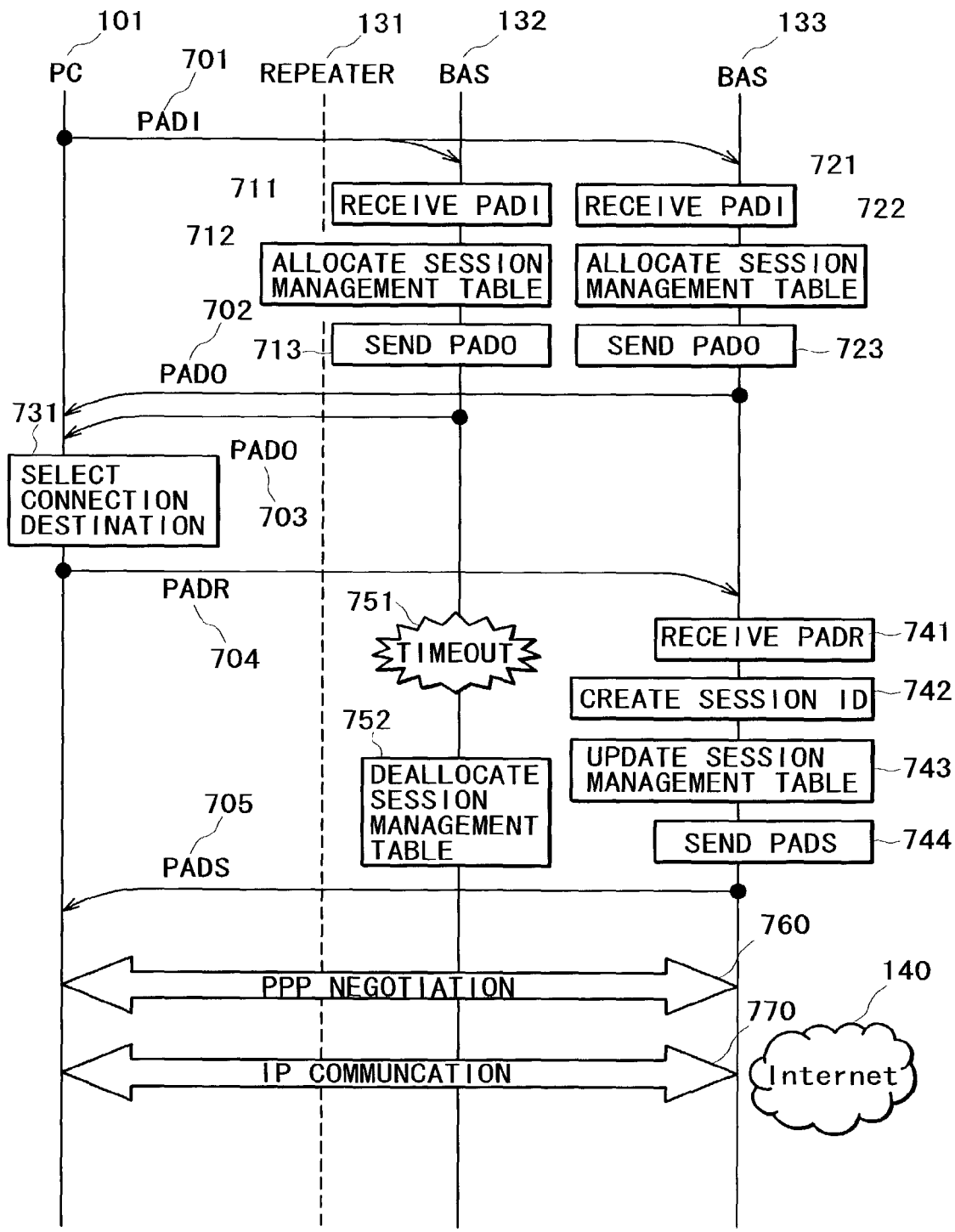
FIG. 16 is a sequence diagram of a conventional PPPoE discovery stage.

In an embodiment variant in which values used as load information are values of each of ATM VCs (virtual LAN segments), as shown in the first embodiment shown in FIG. 16, load information is independently managed for each of individual server information tables 642.

Hereinbefore, a description has been made of the first embodiment which distributes connection requests in normal cases where the values of MAC addresses used by BASes for communications with client terminals are different from each other. In a second embodiment described below, connection requests are distributed in the case where the values of MAC addresses used by BASes for communications with client terminals are identical with each other.

FIG. 13 shows an example (second embodiment) of a message sequence with the PC 101 and a processing procedure in the PPPoE sequence processing part 641 in the case where the MAC addresses of the BAS 132 and BAS 133 are identical in a network configuration shown in FIG. 1. FIG. 13 shows processing in one cycle from reception of a PADI message 1401 from the PC 101 when the BAS 133 is less loaded than the BAS 132, to the establishment of PPPoE session by the BAS 133 to which a connection request is distributed. Components operating the same as in the first embodiment (FIG. 7) are identified by the same reference numerals, and detailed descriptions of them are omitted.

In the second embodiment, since MAC address values used by the BASes 132 and 133 for communications with the PC 101 are to be identical, even if the PC 101 is connected to any of the BASes 132 and 133, it is not recognized by the PC 101 that connection destinations are different. In this case, since the MAC addresses cannot be used for identification between the BASes, aside from the MAC addresses, server identifiers for uniquely identifying the BASes are provided. In each BAS, a server identifier of its own is initially stored.

To a PADI message 1401 sent by the PC 101, the BASes 132 and 133 respond with PADO messages 803 and 802, respectively. However, the second embodiment is different from the first embodiment (FIG. 7) in that the contents of inter-server communication information 1500 set by the inter-server communication information setting 811 or 821 are different and the Source MAC Address setting means 812 and 822 are not executed.

The inter-server communication information 1500 is described below. FIG. 14 shows types of information constituting the inter-server communication information 1500 and values set as the inter-server communication information 1500 by the BASes 132 and 133.

The inter-server communication information 1500 used in the message sequence of the second embodiment (FIG. 13) includes PADR destination server identifier 1501, PADO sending server identifier 1502, PADO sending server load information 902, PADO sending server session ID list 1503, and PADO sending server time stamp 903. Of these items of information, the PADO sending server identifier 1502, PADO sending server load information 902, and PADO sending server session ID list 1503 are set by the PADO observing means 831 and 841. The PADR destination server identifier 1501 and PADO sending server time stamp 903 are set by PADR receiving means 1411 and 741. These collected items of information are set as inter-server communication information in a next cycle (811, 812).

The PADR destination server identifier 1501 is an identifier indicating a server to receive a corresponding PADR message for response of a client terminal to the PADO message. To be more specific, the identifier is determined from a load status of both BASes, and if the BAS 133 is less loaded than the BAS 132, the identifier of the BAS 133 is set in PADO messages sent from any of the BASes 132 and 133. That is, in the second embodiment, as the PADR destination server identifier 1501, the server identifier 1601 of BAS 133 having the smallest load information 1002 (see FIG. 15) is specified, having the same effect as specifying a BAS to which a connection request is distributed, by the Source MAC Address setting means 812 and 822 in the first embodiment (FIG. 7).

The PADO sending server identifier 1502 is the identifier of a server that sent the PADO message. To be more specific, the identifier of BAS 132 is set in a PADO message sent by the BAS 132, and the identifier of BAS 133 is set in a PADO message sent by the BAS 133. That is, the PADO sending server identifier 1502 has the same effect as the PADO sending server MAC address 901 in the first embodiment (FIG. 8).

The PADO sending server load information 902 is load information of a server that sent the PADO message at the time of receiving a PADI message corresponding to the PADO message. To be more specific, the total number of PPPoE sessions established in the BAS, a processor use ratio of the BAS, a use ratio of packet transfer buffer, and the like are used.

The PADO sending server session ID list 1503 is a list of the session IDs of sessions established on the ATM VC at the instant when a server that sent the PADO message received a corresponding PADI message. For example, in the BAS 132, two sessions are established and 0x1 and 0x3 are set, and in the BAS 133, one session is established and 0x2 is set. The PADO sending server session ID list 1503 is used to create a unique session ID value at session establishment, as described later.

The PADO sending server time stamp 903 is time when a PADI message corresponding to the PADO message was received by a server that sent the PADO message.

The server information table 642 referred to when deciding the PADR destination server identifier 1501 of inter-server communication information 1500 holds information as shown in FIG. 15.

The server information table 642, which consists of an entry for each server, holds entry 1610 of the BAS 132 and entry 1620 of the BAS 133 in the case of the second embodiment. Each entry consists of a server identifier 1601 for uniquely identifying the server, load information 1002 of the server, and a list of the session IDs of sessions established in the server. Since the information of the server information table 642 is information collected by observing PADO messages sent by the BASes in the first preceding cycle as in the first embodiment (FIG. 7), information shown in FIG. 15 is held in any of the BASes 132 and 133.

As in the first embodiment (FIG. 7), also in the second embodiment, PADO messages 1402 and 1403 are observed by the PADO observing means 831 and 841. Of inter-server communication information 1500 extracted by the inter-sever communication extracting means 832 and 842, the PADO sending server identifier 1502 is registered in the server information table 642 as a server identifier 1601 by the server information table updating means 833 and 843. Likewise, the PADO sending server load information 902 is registered as load information, and PADO sending server session ID list 1503 is registered as session ID list 1602.

The PC 101 receives two PADO messages 1402 and 1403. Since the MAC addresses of BASes 132 and 133 are identical, both the two PADO messages have an identical MAC address set in the Source MAC Address filed 412. Even if the PC 101 responds to any of the PADO messages with a PADR message 1404 by the connection destination selecting means 731, since the Destination MAC Address field 411 contains a MAC address value common to the BASes 132 and 133, the PADR message 1404 is received in both the BASes 132 and 133 by the PADR receiving means 1411 and 741.

The BASes 132 and 133 extract inter-server communication information 1500 from AC-Cookie TAG contained in the PADR message 1404 by the inter-server communication information extracting means 1412 and 851. By server identifier comparing means 1413 and 1421, PADR destination server identifier 1501 of the inter-server communication information 1500 is compared with their own server identifier. If both match, the PADR message 1404 is received judging it to be directed to the own sever, and if they do not match, it is not received judging it to be not directed to the own server.

Even if the PADR message 1404 has responded to any of the PADO messages 1402 and 1403, since a PADR destination server identifier 1501 stored in them indicates the BAS 133, the server identifier comparing means 1413 of BAS 132 does not receive the PADR message 1404, which is discarded by PADR discard means 1414. The BAS 133 receives the PADR message 1404 by the server identifier comparing means 1421, and as in the first embodiment (FIG. 7), it is judged by the timeout judging means 852 that no timeout occurs if an elapsed time until the PADO sending server time stamp 903 are received is smaller than a predetermined value, in which case the BAS 133 creates a unique session ID value by session ID creating means 1422.

In the session ID creating means 1422, the session ID list 1602 of the server information table 642 is referred to, and a value is created which does not overlap the session ID values of sessions already established. Thereby, under the condition that the MAC addresses of BASes 132 and 133 are identical, each section on the virtual LAN segment (as shown in FIG. 3) can be uniquely identified.

As shown in FIG. 3, virtual LAN segments by ATM VC are built individually for each of DSL modems (for each of subscribers), sessions multiplexed on one virtual LAN segment are not so many, and a PADO sending server session ID list 1503 stored in a PADO message is not so large.

Since one virtual LAN segment corresponds to one subscriber, the subscriber can obtain the total number of established sessions by referring to the session ID list 1602 of the server information table 642. Therefore, the session ID list 1602 can be used not only to create unique session IDs but also to limit the maximum number of sessions that can be established at the same time for each of subscribers (without differentiating between BASes 132 and 133). In typical ADSL subscriber holding service, the maximum number of sessions is one or several.

In the second embodiment, the Destination MAC Address field 411 of a session stage packet sent from the PC 101 after a PPPoE session is established between the PC 101 and BAS 133 contains a MAC address common to the BASes 132 and 133. Therefore, the BAS 133 must refer to the session ID field 422 in PPPoE header 420 to determine whether the session stage packet is directed to it. Conventionally, it has been a common practice to identify the Destination MAC Address field 411 in the PHY processing part 620 and the session ID field 422 in the PPPoE processing part 640. In this case, a session stage packet directed to the BAS 132 is transferred to the PPPoE processing part 640 without being recognized to be not directed to the BAS 133 in the PHY processing part 620, and in the PPPoE processing part 640, it is recognized to be not directed to the BAS 133 and discarded. However, to increase processing performance of the apparatus, it is desirable to discard needless packets at the entrance of the apparatus without transferring them to the inside of the apparatus. Therefore, as an example of apparatus configuration different from that of FIG. 6, by providing the PHY processing part 620 with the session management table 643, the PHY processing part 620 may identify both the Destination MAC Address field 411 and the session ID field 422 to determine whether packets are directed to the own server.

The repeater 131 can be used with a layer 2 switch of a prior art. However, in the embodiments (FIGS. 7 and 13) described above, since PADO messages are used for information exchange between BASes, a PADO message sent to a client by a BAS must reach physically other BAS. The layer 2 switch of a prior art has a MAC address table registering and managing the values of Source MAC Address filed 412 of received packets on a line basis, and has a function for learning which lines apparatuses having what MAC addresses are connected to. There is provided a function for searching the MAC address table with the Destination MAC Address field 411 as key when a packet is transferred, and transferring the packet to only lines to which destination apparatuses are connected. If the MAC address learning function is functioning, a PADO message sent to a client by a certain BAS is transferred to only a line bound for the client terminal without reaching physically other BASes. Therefore, in the first or second embodiment (FIGS. 7 and 13), if the layer 2 switch of the prior art is used as the repeater 131, the MAC address learning function must be halted for use.

The MAC address learning function in the layer 2 switch of the prior art aims at preventing meaningless consumption of line band by not transferring packets to other than destination lines. To achieve the same purpose as the prior art, as an embodiment variant, the following function can be provided for the repeater 131.

In the first embodiment (FIG. 7) applied in normal cases where the MAC addresses of BASes are different, although the repeater 131 has the MAC address learning function as described previously, if the value of Ether Type field 413 of a received packet is 0x8863 indicating a PPPoE discovery stage packet, the packet is broadcast (sent) to all lines without using the MAC address learning function. This prevents interference with information exchange between BASes achieved by observing PADO message in the first embodiment (FIG. 7). Session stage packets after a session is established are transferred to only destination lines, based on the Destination MAC Address field 411 by the MAC address learning function, thereby contributing to prevention of meaningless consumption of line band.

In the second embodiment (FIG. 13) applied in normal cases where the MAC addresses of BASes are identical, the repeater 131 has a function for learning the Source MAC Address filed 412 and the session ID field 422 in pairs. If the session ID field 422 is 0x0, since it indicates a PPPoE discovery stage packet, it is broadcast to all lines. If the session ID field 422 is not 0x0, a line to which a destination apparatus is connected is located based on pairs of Source MAC Address filed 412 and session ID field 422, and the packet is transferred, thereby contributing to prevention of meaningless consumption of line band.

Typical aspects of the present invention except the claims are described below.

(1) In the network system of the invention, the servers include: session ID list setting means for setting a list of the session IDs of sessions established by the own servers in a connection provision signal; signal observing means for observing connection provision signals sent by other servers; session ID list extracting means for extracting a list of the session IDs set in the observed connection provision signal; and session ID assigning means for assigning a session ID value not overlapping the extracted session ID values when a connection request signal is received to establish a new session.

(2) In the network system of the invention, the servers include storing means for storing the extracted server identification information and the load information; and the servers respond to a connection start signal from the client terminal with a connection provision signal and mutually update load information stored in the storing means.

(3) In the network system of the invention, the servers include at least one of connection provision signal sending means, upon receiving a connection start signal from an apparatus other than the client terminal, for sending a connection provision signal for updating load information stored in other servers; and connection start signal sending means for sending a connection start signal to update load information of other servers stored in the own servers.

(4) In the network system of the invention, the servers include time information setting means, upon receiving a connection start signal from the client terminal, for setting receive time information indicating receive time of the connection start signal in a connection provision signal, and receive time information extracting means, upon receiving the connection request signal, for extracting the receive time information contained in the connection request signal;

the client terminal includes signal returning means for setting the receive time information contained in the received connection provision signal in the connection request signal and returning the connection request signal; and the servers include judging means for judging whether the connection request signal is valid or invalid, based on the result of comparing receive time of the connection request signal and time indicated by the receive time information (e.g., in the case where receive time of the connection request signal has elapsed for a predetermined period of time or more from time indicated by the receive time information).

(5) In the network system of the invention, the servers: include encrypting means and decrypting means common to the servers; set information encrypted by the encrypting means in a connection provision signal; and extract the encrypted information from a connection provision signal or a connection request signal returned in response to the connection provision signal, and decrypt encrypted information extracted by the decrypting means.

(6) In the network system of the invention, the PPPoE servers include at least one of PADO message sending means, upon receiving a PADI message from an apparatus other than the PPPoE client terminal, for sending a PADO message for updating load information stored in the PPPoE servers; and PADI message sending means for sending a PADI message to update load information of other PPPoE servers stored in the own servers.

(7) The server apparatuses of the invention include storing means for storing the extracted server identification information (e.g., MAC address, server identifier) and the load information, and responding to a connection start signal from the client terminal with a connection provision signal and mutually updating load information stored in the storing means.

(8) The server apparatuses of the invention include at least one of connection provision signal sending means, upon receiving a connection start signal from an apparatus other than the client terminal, for sending a connection provision signal for updating load information stored in other server apparatuses; and connection start signal sending means for sending a connection signal to update load information of other server apparatuses stored in the own server apparatuses.

(9) The server apparatuses of the invention include: time information setting means, upon receiving a connection start signal from the client terminal, for setting receive time information indicating receive time of the connection start signal in a connection provision signal; time information extracting means, upon receiving the connection request signal, for extracting the receive time information contained in the connection request signal; and judging means for judging whether the connection request signal is valid or invalid, based on the result of comparing receive time of the connection request signal and time indicated by the receive time information (e.g., in the case where receive time of the connection request signal has elapsed for a predetermined period of time or more from time indicated by the receive time information).

(10) The server apparatuses include encrypting means and decrypting means common to the server apparatuses; setting information encrypted by the encrypting means in a connection provision signal; and extracting the encrypted information from a connection provision signal or a connection request signal returned in response to the connection provision signal, and decrypting encrypted information extracted by the decrypting means.

The foregoing invention has been described in terms of preferred embodiments. However, those skilled, in the art will recognize that many variations of such embodiments exist. Such variations are intended to be within the scope of the present invention and the appended claims.

What is claimed is:

1. A network system that realizes a connection between at least one client terminal and plural server apparatuses at least by a connection start signal from the client terminal, a connection provision signal from the server apparatuses, corresponding to the connection start signal, and a connection request signal from the client terminal, corresponding to the connection provision signal, wherein the server apparatuses have an identification information setting means, upon receiving a connection start signal from the client terminal, for setting server identification information for identifying, in the connection provision signal, a specific server apparatus to receive a connection request signal corresponding to the connection start signal, and wherein the server apparatuses include:

load information setting means, upon receiving a connection start signal from the client terminal, for setting their own server identification information and their own load information in the connection provision signal sent to the client terminal;

load information extracting means, upon observing a connection provision signal sent from other server apparatuses destined for the client terminal, for extracting the server identification information and the load information set in the connection provision signal sent from the other server apparatuses to the client terminal; and server identifying means for deciding a server apparatus to receive the connection request signal from the client terminal, based on the extracted load information of each server apparatus, wherein when the server identifying means decides on another server apparatus sending connection signals destined for the client terminal to receive the connection request signal, the identification information setting means sets the server identification information of the decided other server apparatus in the connection provision signal sent from the server to the client terminal.

2. The network system according to claim 1, wherein:

the client terminal includes signal returning means for setting the server identification information contained in the received connection provision signal in the connection request signal and returning the connection request signal; and the server apparatuses include;

identification information extracting means for extracting the server identification information contained in the received connection request signal; and signal receiving means for receiving the connection request signal, based on the result of comparing the server identification information and their own server identification information.

3. The network system according to claim 1, wherein:

the network system is a PPPoE network system comprising at least one PPPoE client terminal and plural PPPoE server apparatuses;

the connection start signal is a PPPoE Active Discovery Initiation (PADI) message, the connection provision signal is a PPPoE Active Discovery Offer (PADO) message, and the connection request signal is a PPPoE Active Discovery Request (PADR) message;
MAC addresses of the PPPoE server apparatuses, used for communications with the PPPoE client terminals are set to be different from each other; and
the identification information setting means sets, as the server identification information, a MAC address of the specific PPPoE server apparatus in the PADO message.

4. The network system according to claim 3,
wherein the PPPoE server apparatuses include:
load information setting means, upon receiving a PADI message from the PPPoE client terminal, for setting their own MAC address and their own load information in a PADO message;
load information extracting means, upon observing a PADO message sent from other server apparatuses destined for the client terminal, for extracting the MAC address and the load information set in the PADO message; and
server identifying means for deciding on a PPPoE server apparatus to receive the PADR message, based on the extracted load information of each server apparatus.

5. The network system according to claim 4, wherein:
the PPPoE server apparatuses include storing means for storing the extracted MAC address and the load information; and
the PPPoE server apparatuses respond to a PADI message from the PPPoE client terminal with a PADO message and mutually update load information stored in the storing means.

6. The network system according to claim 3, wherein the PPPoE server apparatuses include:
session ID list setting means for setting a list of the session IDs of PPPoE sessions established by the server apparatuses in a PADO message;
message observing means for observing PADO messages sent by other PPPoE server apparatuses destined for the client terminal;
session ID list extracting means for extracting a list of the session IDs set in the observed PADO message; and
session ID assigning means for assigning a session ID value not overlapping the extracted session ID values when a PADR request signal is received to establish a new PPPoE session.

7. The network system according to claim 3,
wherein the PPPoE server apparatuses include:
load information setting means, upon receiving a PADI message from the PPPoE client terminal, for setting the their own server identifier and their own load information in a PADO message;
load information extracting means, upon observing a PADO message sent from other server apparatuses, for extracting the server identifier and the load information set in the PADO message; and
server identifying means for deciding a PPPoE server apparatus to receive the PADR message, based on the extracted load information of each server apparatus.

8. The network system according to claim 7, wherein:
the PPPoE server apparatuses include storing means for storing the extracted server identifier and the load information; and
the PPPoE server apparatuses respond to a PADI message from the PPPoE client terminal with a PADO message and mutually update load information stored in the storing means.

9. The network system according to claim 7,
wherein the PPPoE server apparatuses include at least one of:
PADO message sending means, upon receiving a PADI message from an apparatus other than the PPPoE client terminal, for sending a PADO message for updating load information stored in the PPPoE server apparatuses; and
PADI message sending means for sending a PADI message to update load information of other PPPoE server apparatuses stored in the server apparatuses.

10. The network system according to claim 3, wherein:
the PPPoE server apparatuses include;
time information setting means, upon receiving a PADI message from the PPPoE client terminal, for setting receive time information indicating receive time of the PADI message in a PADO message; and
time information extracting means, upon receiving the PADR message, for extracting the receive time information contained in the PADR message;
the PPPoE client terminal includes message returning means for setting the receive time information contained in the received PADO message in the PADR message and returning the PADR message; and
the PPPoE server apparatuses include judging means for judging whether the PADR message is valid or invalid, based on the result of comparing receive time of the PADR message and time indicated by the receive time information.

11. The network system according to claim 3, wherein the PPPoE server apparatuses:
include encrypting means and decrypting means;
set information encrypted by the encrypting means in a PADO message; and
extract the encrypted information from a PADO message or a PADR message returned in response to the PADO message, and decrypt encrypted information extracted by the decrypting means.

12. The network system according to claim 1, wherein:
the network system is a PPPoE network system comprising at least one PPPoE client terminal and plural PPPoE server apparatuses;
the connection start signal is a PADI message, the connection provision signal is a PADO message, and the connection request signal is a PADR message;
MAC addresses of the PPPoE server apparatuses used for communications with the PPPoE client terminals are set to be identical with each other; and
the identification information setting means sets, as the server identification information, a server identifier not overlapping among PPPoE server apparatuses that is different from the MAC addresses, in the PADO message.

13. The network system according to claim 12, wherein:
the PPPoE client terminal has message returning means for setting the server identifier contained in the received PADO message in the PADR message and returning the PADR message;
the PPPoE server apparatuses include;
identifier extracting means for extracting the server identifier contained in the received PADR message; and
message receiving means, based on the result of comparing the server identifier and their own server identifier, for comparing the server identifier and their own server identifier and receiving the PADR message if both match.

14. A server apparatus that realizes a connection with at least one client terminal at least by a connection start signal from the client terminal, a connection provision signal from the server apparatus, corresponding to the connection start signal, and a connection request signal from the client terminal, corresponding to the connection provision signal, wherein the server apparatus has an identification information setting means, upon receiving a connection start signal from the client terminal, for setting server identification information for identifying, in the connection provision signal, a specific server apparatus to receive a connection request signal corresponding to the connection start signal, and wherein the server apparatus includes session ID list setting means for setting a list of the session IDs of sessions established by the server apparatuses in a connection provision signal sent to the client terminal;

signal observing means for observing connection provision signals sent by other server apparatuses destined for the client terminal;

session ID list extracting means for extracting a list of the session IDs set in the observed connection provision signals;

session ID assigning means for assigning a session ID value not overlapping the extracted session ID values when a connection request is received to establish a new session; and server identifying means for deciding a server apparatus to receive the connection request signal from the client terminal, wherein when the server identifying means decide on another server apparatus sending connection provision signals destined for the client terminal to receive the connection request signal, the identification information setting means sets the server identification information of the decided other server apparatus in the connection provision signal sent from the server to the client terminal.

15. The server apparatus according to claim 14, including:

connection request signal receiving means for receiving a returned connection request signal in which the server identification information contained in a connection provision signal received by the client terminal is set;

identification information extracting means for extracting the server identification information contained in the received connection request signal; and signal receiving means, based on the result of comparing the server identification information and its own server identification information, for comparing the server identification information and its own server identification information and receiving the connection request signal if both match.

16. The server apparatus according to claim 14, including:

load information setting means, upon receiving a connection start signal from the client terminal, for setting the its own server identification information and its own load information in a connection provision signal;

load information extracting means, upon observing a connection provision signal sent from other server apparatuses, for extracting the server identification information and the load information set in the connection provision signal; and server identifying means for deciding a server apparatus to receive the connection request signal, based on the extracted load information of each server apparatus.

17. The server apparatus according to claim 14, wherein:

the server apparatus is a PPPoE server apparatus used in a PPPoE network system comprising at least one PPPoE client terminal and plural PPPoE server apparatuses;

the connection start signal is a PADI message, the connection provision signal is a PADO message, and the connection request signal is a PADR message;

MAC addresses of the PPPoE server apparatuses, used for communications with the PPPoE client terminals are set to be different from each other; and the identification information setting means sets, as the server identification information, a MAC address of the specific PPPoE server apparatus in the PADO message.

18. The server apparatus according to claim 14, wherein:

the server apparatus is a PPPoE server apparatus used in a PPPoE network system comprising at least one PPPoE client terminal and plural PPPoE server apparatuses;

the connection start signal is a PADI message, the connection provision signal is a PADO message, and the connection request signal is a PADR message;

MAC addresses of the PPPoE server apparatuses, used for communications with the PPPoE client terminals are set to be identical with each other; and the identification information setting means sets, as the server identification information, a server identifier not overlapping among PPPoE server apparatuses that is different from the MAC addresses, in the PADO message.

\* \* \* \* \*